US000001181H

United States Statutory Invention Registration [19]

[11] Reg. Number: H1181

Rihaczek

[43] Published: May 4, 1993

[54] METHOD FOR HIGH RESOLUTION RADAR IMAGERY AND ACCURATE DIMENSIONAL MEASUREMENTS

[75] Inventor: August W. Rihaczek, Rolling Hills, Calif.

[73] Assignee: The United States of America as represented by the Secretary of the Air Force, Washington, D.C.

[21] Appl. No.: 120,216

[22] Filed: Nov. 6, 1987

Related U.S. Application Data

[63] Continuation-in-part of Ser. No. 754,895, May 16, 1985, abandoned.

[51] Int. Cl.[5] ..... G01S 13/89

[52] U.S. Cl. ..... 342/25; 342/195

[56] References Cited

U.S. PATENT DOCUMENTS

| | | | |
|---|---|---|---|
| 4,068,234 | 1/1978 | O'Meara . | |
| 4,204,262 | 5/1980 | Fitelson | 364/822 |
| 4,209,853 | 6/1980 | Hyatt | 367/8 |
| 4,385,301 | 5/1983 | Tricoles et al. . | |
| 4,387,373 | 6/1983 | Longuemare, Jr. . | |
| 4,389,092 | 6/1983 | Tamura | 350/162.12 |

*Primary Examiner*—Bernarr E. Gregory
*Attorney, Agent, or Firm*—Bernard E. Franz; Donald J. Singer

[57] ABSTRACT

This invention involves a method of processing radar returns to form two-dimensional images of targets such as ground vehicles, aircraft, ships, and so forth. Resolution in one dimension is provided by range resolution, and resolution in the other dimension is provided by Doppler resolution. Man-made targets such as ground vehicles or ships consist of scattering centers which are extended smooth plates, long edges, rods and the like. These scattering units typically are so large compared with the radar wavelength that they have a highly lobed backscattering pattern. When the processing time is increased in order to achieve higher Doppler resolution, it is possible to observe over the processing time a full or even more than one sidelobe of the backscattering pattern. Doppler resolution theory shows that under these circumstances the responses of scatterers are smeared out into meaningless background interference, so that image detail is lost. The present invention avoids this problem by analyzing the signal in segments much shorter than used with conventional processing. This is done despite the fact that the required image detail appears to demand long processing times. Processing a scatterer only over the time interval in which it is dominant (it governs the behavior of the phase then) prevents the smearing of scatterers and there is no need to resolve one from another. The result is an improved radar image of actual targets.

4 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR HIGH RESOLUTION RADAR IMAGERY AND ACCURATE DIMENSIONAL MEASUREMENTS

RIGHTS OF THE GOVERNMENT

The invention described herein may be manufactured and used by or for the Government of the United States for all governmental purposes without the payment of any royalty.

This application is a continuation-in-part of application Ser. No. 06/754,895, filed May 16, 1985, now abandoned.

BACKGROUND OF THE INVENTION

This invention relates to a processing method for producing high resolution radar imagery and accurate dimensional measurements using synthetic or inverse synthetic aperature radar. The data is from an airborne radar using a "stretch" format, that is, a long linear FM waveform is used for each individual radar pulse, and the returned waveforms are then mixed on reception with a reference chirp.

In many radar application it is necessary to form two-dimensional images of targets such as ground vehicles, aircraft, ships, and so forth. Resolution in one dimension is provided by range resolution, and resolution in the other dimension is provided by Doppler resolution. The principles are widely applicable and widely applied. Synthetic aperture radar forms two-dimensional images in range and cross range on this basis by utilizing the motion of the platform for Doppler resolution. Inverse synthetic aperture radar is accomplishing the same objective by utilizing the motion of the target to be imaged. In other applications the same principle of Doppler resolution is used, even though no specific name has been given to the process. The very same principles also if, instead of forming images, the processor uses range and Doppler resolution to resolve specific scatterers on the target, and then measures the separation of these scatterers in order to obtain target dimensions.

A serious problem appears with Doppler resolution for man-made targets. Underlying the principles of Doppler resolution is the assumption that a target can be modeled by a set of fixed point scatterers. The emphasis here is placed on "point" scatterers, which term implies that the backscattering behavior is not aspect-angle dependent. In other words, the backscattering is isotropic. In this case as the processing time is increased in order to achieve better Doppler resolution, it is indeed possible to resolve scatterers which are more closely spaced, thus obtaining an image with more detail. Unfortunately, however, man-made targets do not correspond to this model, and Doppler resolution is not working as desired.

Man-made targets such as ground vehicles or ships consist of scattering centers which are extended smooth plates, long edges rods, and the like. These scattering units typically are so large compared with the radar wavelength that they have a highly lobed backscattering pattern. In low-resolution applications coherent processing will extend over relatively small changes in the aspect angle of the target, so that the radar may stay within one and the same sidelobe of the backscattering pattern. However, when the processing time is increased in order to achieve higher Doppler resolution, there will be observed over the processing time a full or even more than one sidelobe of the backscattering pattern. Doppler resolution theory shows that under these circumstances the responses of scatterers are smeared out into meaningless background interference, so that image detail is lost. It is a serious effect which drastically degrades image quality. It is equally detrimental for dimensional measurements, since most of the scatterers will not be observable at all.

As an illustration of the problem, in FIG. 1 shows a two-dimensional image of a tank generated by conventional processing methods. The positions of responses, which then were plotted by the computer as circles. The larger circles mark the positions of stronger responses, whereas the small circles indicate responses so weak that they are more likely to be background interference. A diagram of the tank is overlaid. Note that the stronger responses form a type of L, which is characteristic for conventional images of stationary tanks. Evidently, much detail is lost. It takes a trained operator to recognize that this is the image of a stationary tank, and even for such an operator it is impossible to recognize what tank it is. Conventional imaging does not work at all when the vehicles are moving, so that no sample "image" is shown there.

U.S. patents of interest include Tricoles et al U.S. Pat. No. 4,385,301, which discloses a system providing an image of the location of emitters of electromagnetic radiation behind enemy lines on a battlefield. The patented system comprises an array of antennas for receiving electromagnetic radiation from emitters, and for providing a received signal from each emitter in response to the received radiation; a receiver system coupled to each antenna of the array for measuring the phase and intensity of each received signal, and for providing separate coherent phase signals and amplitude signals that respectively indicate the measured phase and intensity; and a signal processor coupled to the receiver system for processing the coherent phase signals and amplitude signals to provide an image signal for generating an image of the emitters. U.S. Pat. No. 4,387,373 to Longuemare Jr. in column 4, lines 3–6 speaks of improving the quality of a synthetic monopulse radar image by increasing the processing rate. A high speed ambiguity function evaluation processor is taught by Tamukra in U.S. Pat. No. 4,389,373. In U.S. Pat. No. 4,209,853, Hyatt combines a high resolution narrow field-of-view array with a low resolution wide field-of-view array in a holographic processor. In U.S. Pat. No. 4,068,234, O'Meara processes imaging information with a computer programmed for inverse Fourier transform computations, and in U.S. Pat. No. 4,204,262 Fitelson et al perform optical signal processing with a direct electronic Fourier transform.

SUMMARY OF THE INVENTION

An object of the invention is to provide a radar data processing technique to measure accurately the positions of scattering centers on a target, and from the configurations of there scattering centers to obtain target dimensions and shape.

This invention involves a method of processing radar returns to form two-dimensional images of targets such as ground vehicles, aircraft, ships, and so forth. Resolution in one dimension is provided by range resolution, and resolution in the other dimension is provided by Doppler resolution. Man-made targets such as ground vehicles or ships consist of scattering centers which are extended smooth plates, long edges, rods and the like. These scattering units typically are so large compared with the radar wavelength that they have a highly lobed backscattering pattern. When the processing time is increased in order to achieve higher Doppler resolution, it is possible to observe over the processing time a full or even more than one sidelobe of the backscattering pattern. Doppler resolution theory shows that under these circumstances the responses of scatterers are smeared out into meaningless background interference, so that image detail is lost. The present invention avoids this problem by analyzing the signal in segments much shorter than used with conventional processing. This is done despite the fact that the required image detail appears to demand long processing times. Processing a scatterer only over the time interval in which it is dominant (it governs the behavior of the phase then) prevents the smearing of scatterers and there is no need to resolve one from another. The result is an improved radar image of actual targets.

REPORT

The invention is disclosed in a technical report AFWAL-TR-81-1151, titled "Ground Moving Target Identification Via Target Motion Resolution" for Air Force contract F33615-80-C-1065. The report is part of the Defense Technical Information Center collection of documents with the accession number AD C027234. A microfiche copy is attached hereto as an appendix, and is hereby incorporated by reference.

DETAILED DESCRIPTION

As stated above, it is the highly lobed backscattering pattern of the scattering centers on man-made targets which causes smearing and loss of image detail. This sidelobe pattern implies that when the radar views several scattering centers in one range cell, their backscattering at any one time will be very different. For example, at a given time the radar may see the peak of the backscattering sidelobe from one scatterer, but the null (no backscattering) from another. This means that over some observation time scatterers will become stronger and weaker, alternately effectively appearing and disappearing. Over the processing time needed to form a high-resolution image, many such cycles may occur.

Figure 1:
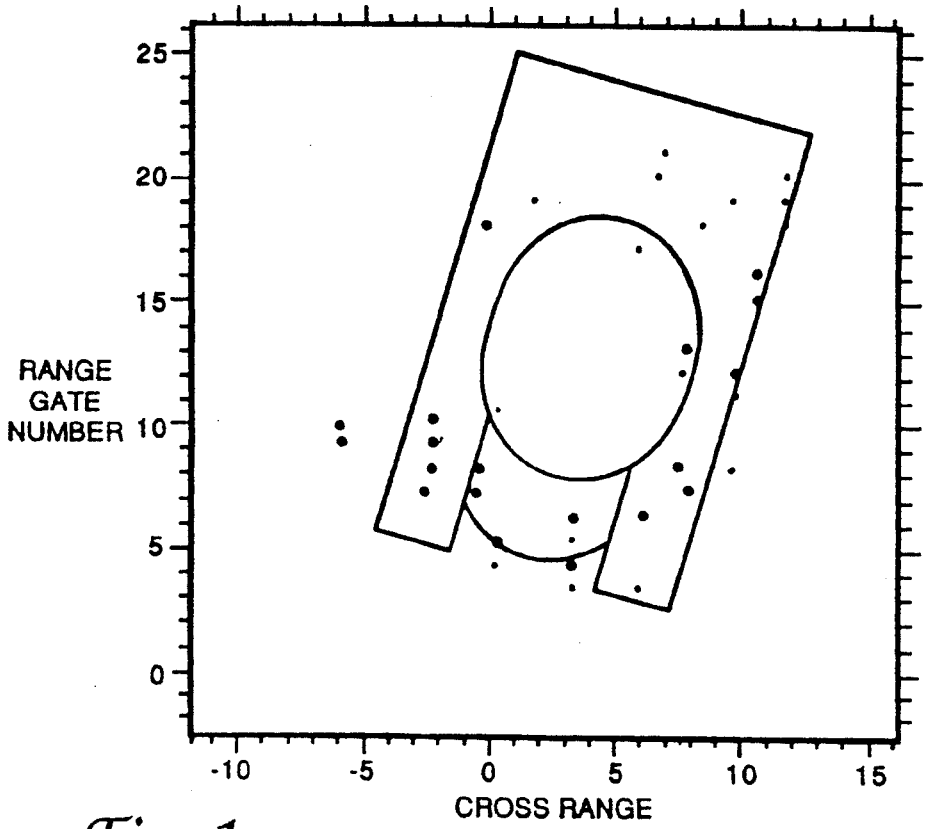
FIG. 1 is a diagram showing an image of a stationary tank with conventional radar signal processing.
Figure 2:
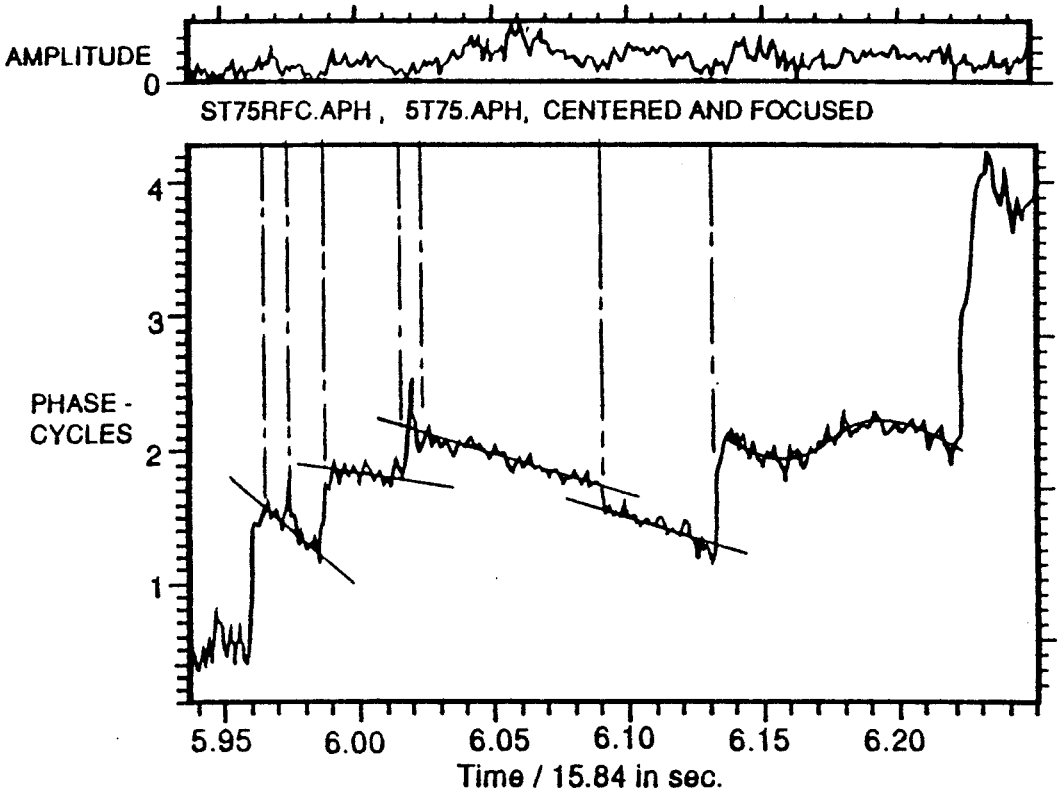
FIG. 2 is a graph giving an example of the amplitude phase curve for a stationary tank.

The problem is illustrated by FIG. 2, which shows the amplitude and phase functions for the return from a single range gate for the tank data which led to FIG. 1. Of interest is the phase function. If the range cell contained a single scatterer with isotropic behavior, the phase would increase or decrease linearly, the slope of the phase function giving the Doppler of the scatterer. If the range cell contained two such scatterers, the phase function would again be linearly increasing or decreasing, as for a single scatterer, but a roughly sinusoidal modulation would be impressed by the second scatterer.

Now consider the actual example of FIG. 2 Ignoring the high-frequency noisy variations and considering only the trend indicated by the lines drawn in the figure, Line 1 shows that a particular scatterer can be observed at this time, but only for a very short interval. Then the scatterer associated with the segment of Line 2 becomes dominant. Later another scatterer is observed, associated with lines 3 and 3'. The two segments are associated with the same scatterer, because the lines have the same slopes. With the curve marked 4, again for a short period, a pair of scatterers is observed. This the fact is verified that scatterers appear and disappear.

Conventional processing typically extends over the total time interval shown in FIG. 2, so as to obtain high "resolution." However, with a backscattering behavior of the type shown in FIG. 2 the result will be smearing of responses and their disappearance, rather than high resolution. The actual targets simply do not conform to the model underlying conventional Doppler processing.

Based on these findings, the invention provides the following solution to the problem: If scattering centers do not persist over the times needed to achieve the desired Doppler resolution, then shorter processing times are required. In fact, the processing times cannot be longer than the time intervals over which the scatterers persist. By processing a scatterer only over the time interval in which it is dominant (it governs the behavior of the phase then), there is no need to resolve it from other scatterers. A measurement of its position can be made to a small fraction of the width of the resolution cell, obtaining an accuracy corresponding to long processing times without actually using long processing times. The same approach also prevents the smearing of scatterers, and hence their loss. The central idea of this invention is to use short processing times, despite the fact that the required image detail appears to demand long processing times. Typically, the processing time may be 10% of that used with conventional processing, but the number is not important.

There are various ways in which the processing principle can be implemented. Three methods successfully have been tried, but there might be other implementations of the same principle. The common feature is always that the signal is analyzed in segments much shorter than used with conventional processing.

As one possibility, such phase segments as marked in FIG. 2 can be identified. Where, aside from the high-frequency variations, the trend is linear, the slope can be measured, which is the Doppler and can be translated in to cross range. For each such slope a point can be marked at which the corresponding scatterer appears. If so desired, the strength of the scatterer can be obtained from the signal amplitude, shown in FIG. 2, at the time at which the scatterer appears. An analysis of pairs of scatterers, such as in Segment 4 of FIG. 2, follows similar rules.

As another possibility, short-term Fourier transforms can be used, rather than the much longer-term Fourier transforms of conventional processing, followed by analysis of the result to determine positions of scatterers. The third approach is to correct phase jumps, such as the one which occurs between Segments 3 and 3' in FIG. 2, so as to lengthen the available time interval. Although in this case the transform then is taken over a longer time, note that the signal first was analyzed on a pulse-by-pulse basis through its phase function. This a the extreme of a "short" processing time.

Figure 3:
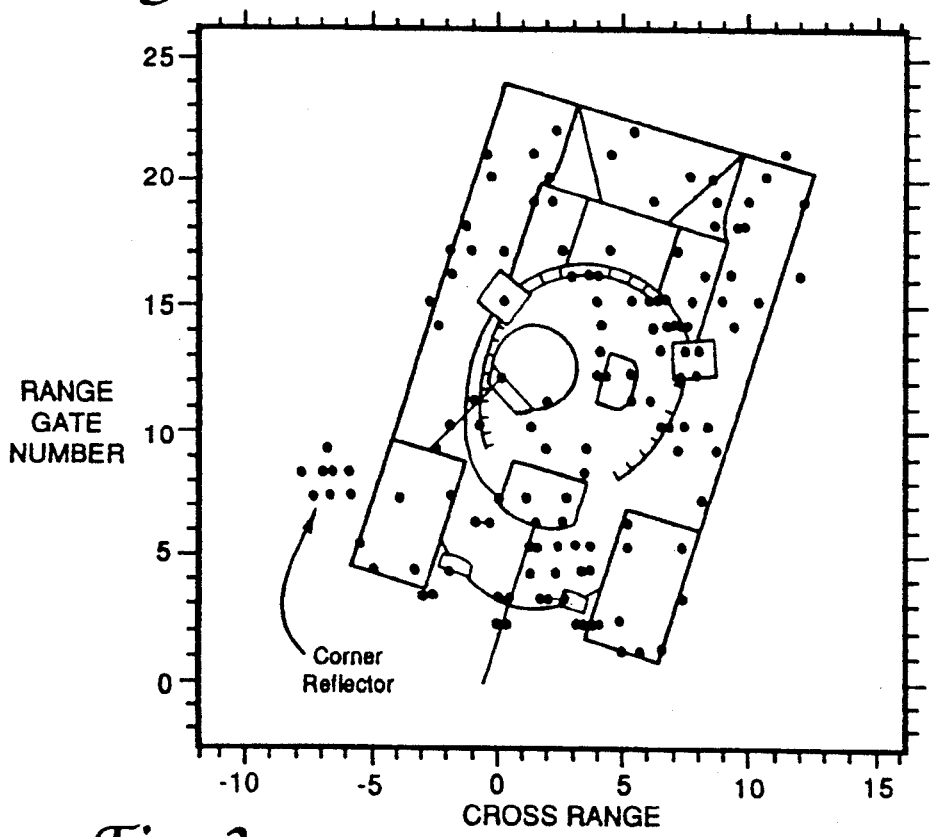
FIG. 3 is a diagram showing the image of a stationary tank with the new processing method.

To indicate the success obtained with this new processing approach, FIG. 3 shows a reprocessing of the same image as in FIG. 1 with the novel method. The increase in the image detail is striking. Note that the overall dimensions of the tank are now accurately defined. Even the machine gun on top of the turret is visible. In this case, the image was obtained by using short-term Fourier transforms, with a duration about 10% of that which would have to be used with conventional processing. However, the other forms of implementation have been tested on a moving tank and a moving jeep. In either case, highly accurate positions of scatterers are obtained without losing most of the scatterers, using processing times far too short to provide high Doppler resolution with conventional processing methods. Moreover, the approach is robust because there is no attempt to utilize superresolution techniques, which work on paper but not in practice. Note that the images shown here as illustrations were derived from real radar data taken under practical conditions.

For a more detailed description of the invention, section 5 of the technical report AFWAL-TR-81-1151 is substantially reproduced below.

5. IMAGING OF THE STATIONARY TANK

5.1 The Problem With Conventional SAR Images

The objective is to obtain processing results superior to those achieved with conventional SAR processing. To this end, it is necessary first to determine the specific problem with SAR imaging. As already pointed out, the problem is caused by the backscattering behavior of man-made targets. However, the better the details of the problem are understood, the more successful should be the evolution of superior processing methods. It is desired to improve upon the image of a stationary tank, but it would also be desirable to improve upon the results achieved for the moving tank, because a stationary tank should be easier to analyze than a moving tank.

Figure 4:
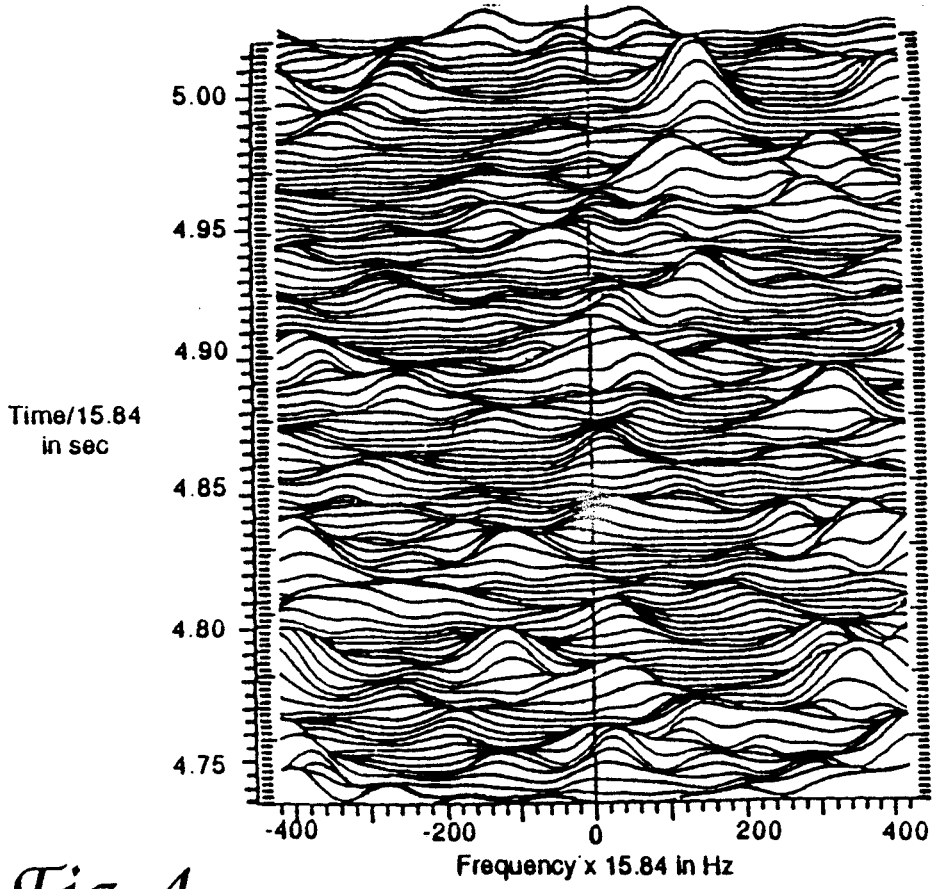
FIG. 4 is a graph showing a doppler plot for gate 4.877 m (16.0 ft), outside the range interval of the tank.

FIG. 4 shows a Doppler plot for a range cell just outside the boundaries of the tank. Each frame represents the spectrum within the range gate corresponding to the computer printout for the center of the ordinate, in meters. In the case of FIG. 4 this would be a range gate of 4.887 m or 16.00 ft. Otherwise, the ordinate is a true time axis, with the time separation of adjacent frames being 0.0375 sec. Since there are 120 frames plotted, the spectra are shown over a total time period of $120 \times 0.0375 = 4.5$ sec. The plot shows that the range gate contains only clutter; or at least that the clutter in the range gate completely overrides any return from the tank (the gate may contain the gun barrel).

Figure 5:
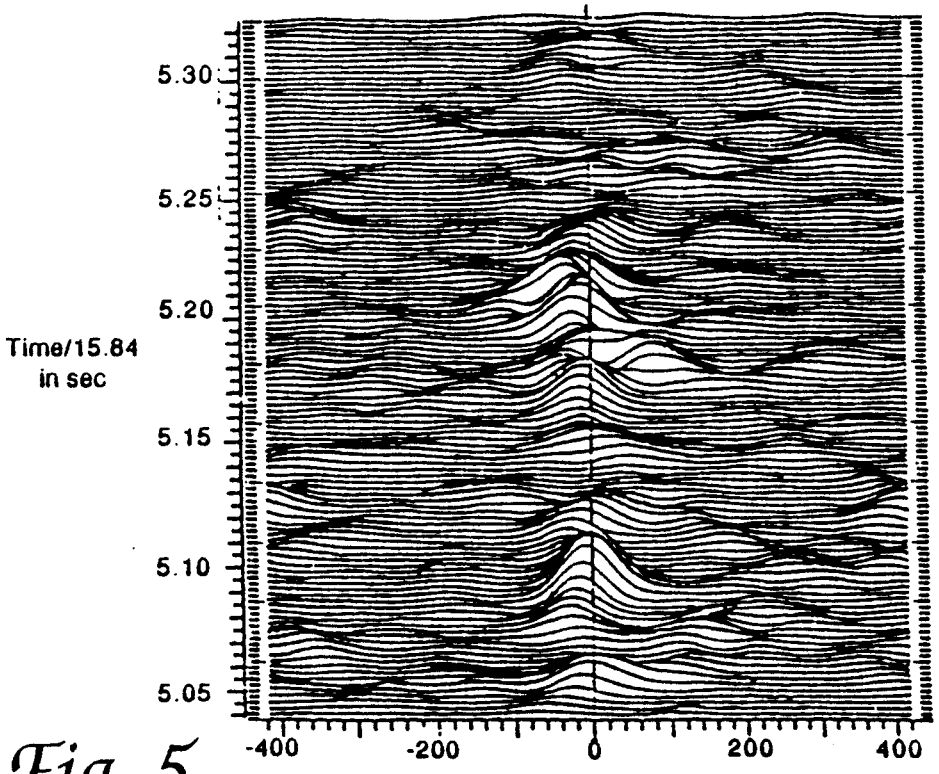
FIG. 5 is a graph showing a doppler plot for gate 5.18 m, first gate with a tank return.
Figure 6:
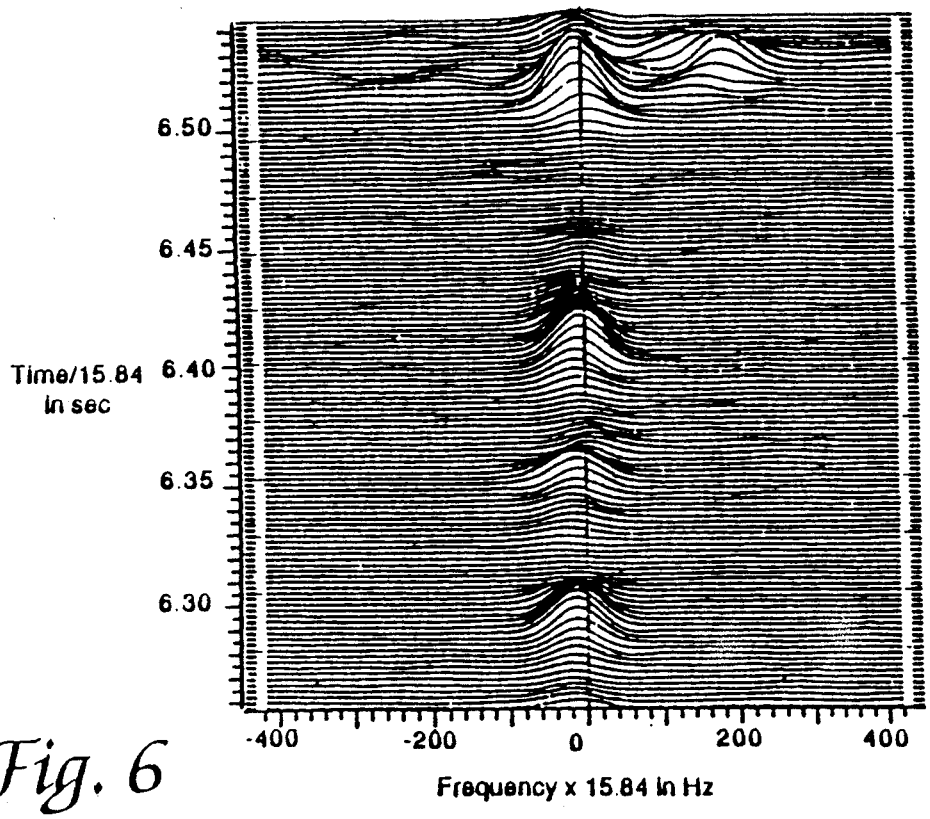
FIG. 6 is a graph showing a doppler plot for gate 6.4 m, (tank)

FIG. 5 shows the same type of plot one range gate farther away, which is the gate at 5.18 m or 17.0 ft. The only change in the plot parameters is that the amplitude scale of FIG. 5 was decreased by the factor of 0.27 from that of FIG. 4, so that the amplitudes in FIG. 4 are correspondingly higher. The tank response now appears at about the zero-Doppler vertical line, where it should appear due to the motion compensation. FIG. 6 shows the same type of plot for Gate 6.4 m or 21.0 ft, FIG. 7 for Gate 9.753 m, and FIG. 8 for Gate 10.97 m.

The characteristics of these Doppler plots evidently are similar. The responses are fluctuating with time, and the Doppler positions of the peaks are varying slightly. (The distortions at the top of the plot are due to the phase jumps in the data and should be ignored). Under the circumstances the Doppler coordinate is translated into cross range in meters by multiplication with the factor of 0.0929. This, for a tank width of 3.6 m, the Doppler spread of the tank becomes $3.6/0.0929 = 38.8$ Hz. A look at the Doppler scale of the plots shows how small this Doppler spread actually is, and how significant the "slight" variations in the peak positions are. With conventional SAR processing one simply increases the processing time for the spectrum over the entire 4.5 sec, obtaining only a single spectrum. It is necessary to determine why this leads to difficulties.

Figure 9:
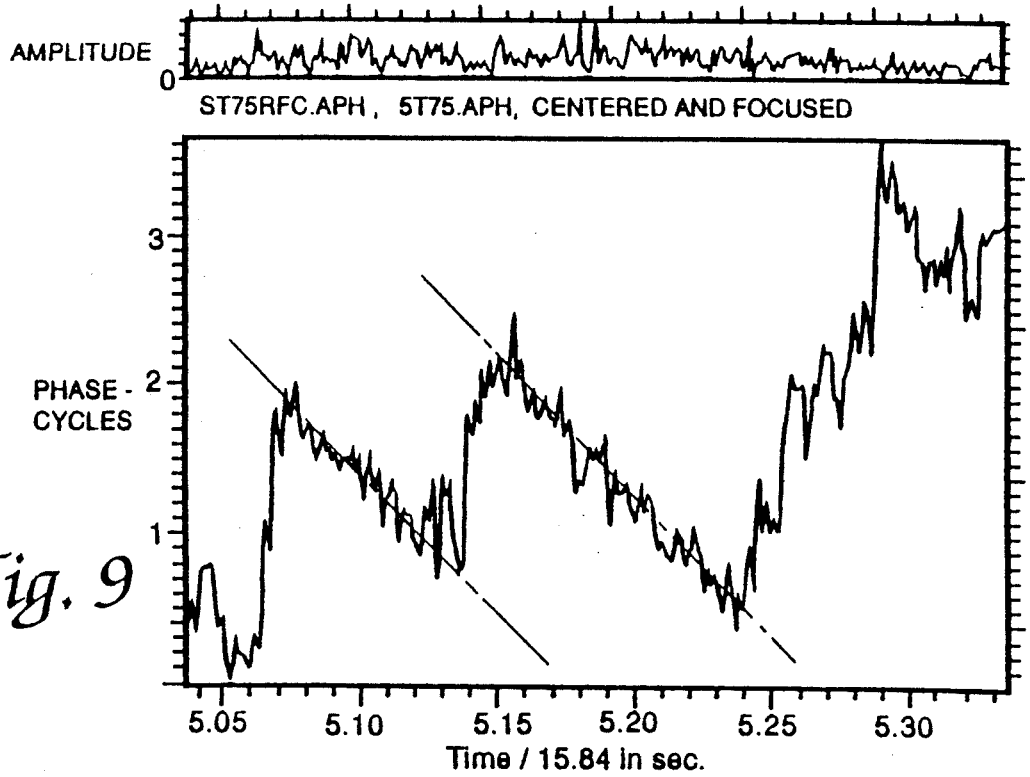
FIG. 9 is a graph showing amplitude and phase for gate 5.18 m, (tank)

The situation is most easily understood by plotting the phase function of the signal in a given range gate. This phase function is shown for Gate 5.18 m in FIG. 9 together with the amplitude of the signal. Two segments of the phase function appear over which it has (aside from the noisy variations) essentially constant slope. Since Doppler is the time derivative of phase, the response has constant Doppler over these segments. The processing time could be increased to cover the individual segments without any detrimental consequences. However, if the processing time is extended over the entire observation time, as is done with SAR processing, evidently averaging occurs over various types of phase discontinuities. It would be an unlikely accident if this led to good results.

Figure 10:
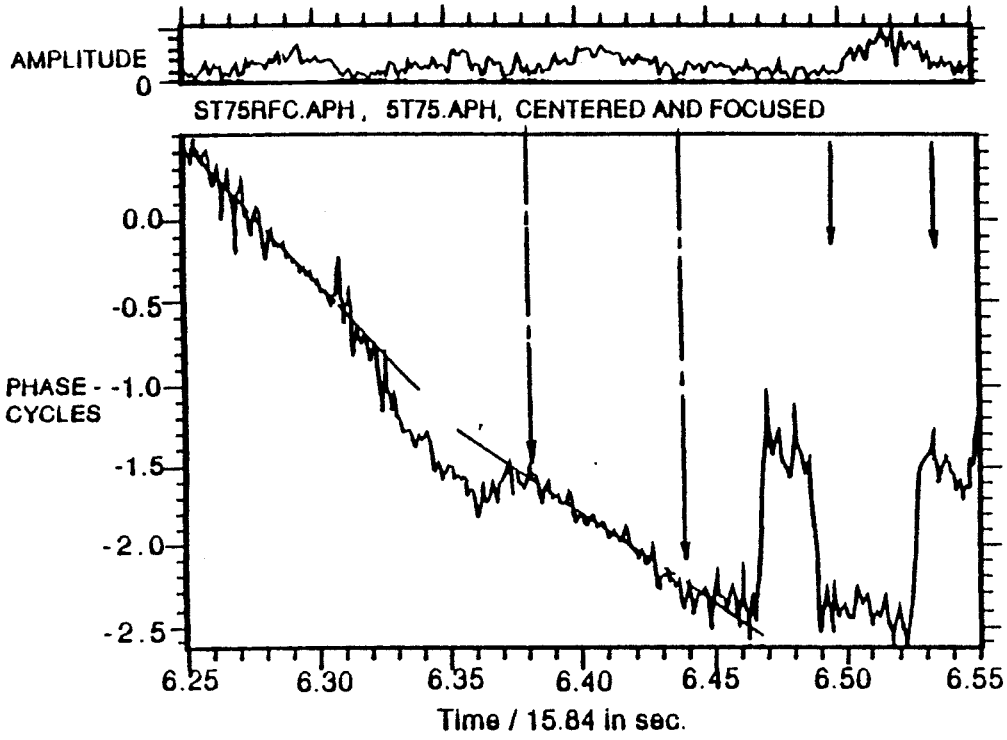
FIG. 10 is a graph showing amplitude and phase for gate 6.4 m, (tank)

FIG. 10 is the phase plot for Gate 6.4 m, and it illustrates an additional problem. One now can readily identify several distinct phase slopes, which implies that the Doppler is changing in steps. The practical interpretation is the following: At any one time, a specific scattering center at a fixed location on the tank (and hence having a fixed Doppler) is predominant. With time, the return from this scatterer becomes weak, and another scatterer having a different Doppler becomes predominant, and so on over the observation time. This behavior is confirmed by the amplitude plot on top, which shows increases and decreases that correlate with the changes in the phase slope. Thus, each scatterer is observed strongly only over a short period, after which it is "replaced" by another scatterer. Evidently, if one simply extends the processing time over the entire observation interval, so as to increase Doppler resolution, the resulting "response" will be some meaningless average over the responses from the individual scatterers. This is why SAR processing fails.

Figure 11:
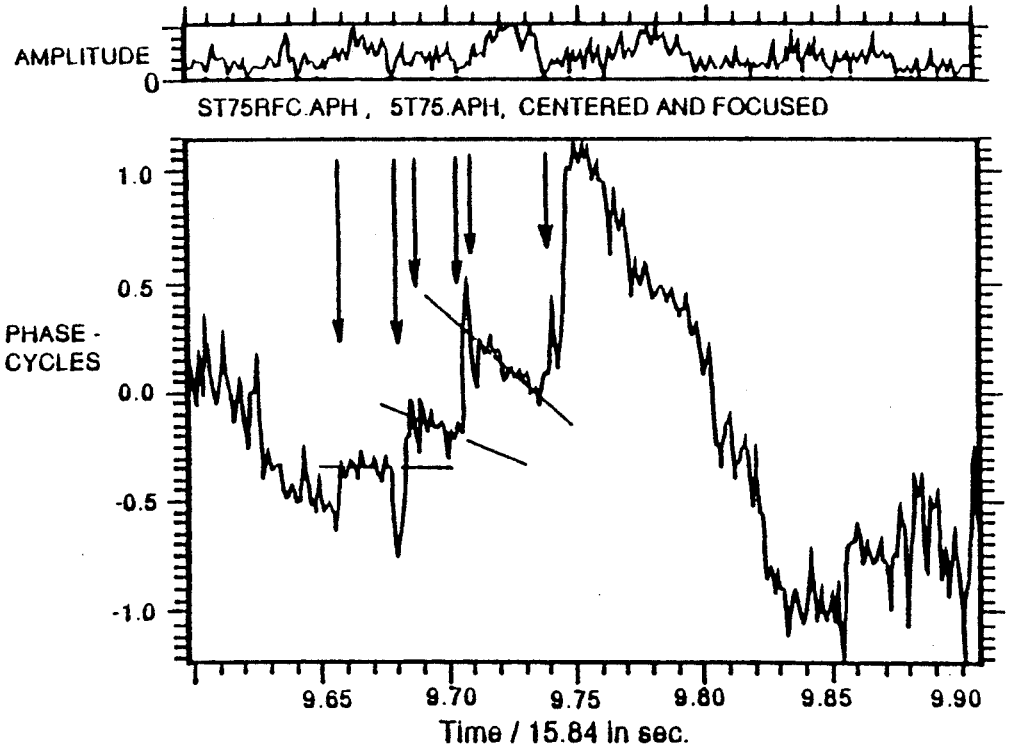
FIG. 11 is a graph showing amplitude and phase for gate 9.753 m, (tank)

Lastly in FIG. 11 is shown the phase and amplitude plots for Gate 9.753 m. The effects are the same, or perhaps somewhat worse. To summarize the situation, one can state the following: Doppler processing, and with it SAR processing, is based on the assumption that each scatterer is a point scatterer whose amplitude is constant over the entire processing time. In actual fact, the scatterers on a man-made target persist only over periods so short that they cannot be resolved in Doppler from each other if an equally short processing time is used. If the processing time is increased in order to achieve "Doppler resolution", the result will be a smearing of the responses into more or less meaningless clutter. Some strong responses may remain near their nominal positions. This is why SAR processing of a stationary tank shows a few responses which are roughly arranged in the from of an L. The two near edges of a tank are responsible for this behavior. However, a similar effect might occur with APCs or even the larger trucks. SAR imaging thus will not allow reliable classification, and evidently is unsuited for identification.

5.2 Choice of an Improved Processing Method

The question to be answered is: Given the peculiar backscattering behavior of man-made targets, what is the best processing method for pinpointing the location of individual scatterers in each range gate? Unfortunately, the investigation needed to answer this question goes much beyond the scope of this program. Hence, the question posed under this program is: What type of processing should be used in order to obtain in the simplest possible fashion a significant improvement over the results with conventional SAR processing?

Earlier the problems caused by amplitude modulation introduced by the backscattering pattern of individual scattering centers were discussed at great length. In order to obtain meaningful results for the moving tank, in this first phase of the program elaborate phase correction procedures were used that offset much of the effects from the pattern modulation. In this second phase, the need for phase corrections have been successfully avoided by using the following argument: If the phase function within a range gate is well behaved over extended sections, the data evaluation can be restricted to those sections and ignore the transitions where phase corrections would be needed. This approach may not allow extraction of *all* the information within the signals, but it would lead to significant improvement over conventional imagery.

There has not been the opportunity to check whether or not the same approach would also be successful for the moving tank processed during Phase 1 of this program. However, even if the method were restricted to stationary tanks (and other vehicles), it still would be valuable because even under operational conditions it is always known whether the vehicle is stationary before processing for identification. Thus one need not necessarily use the same identification procedure for both stationary and moving vehicles.

The first idea was tested and was to confine giving attention to the linear-phase segments in the phase plot for each range gate, and to determined the corresponding Doppler (which is then converted to cross range). This will yield as many scatterers per range gate as there are identifiable linear segments of different slopes in the phase function. The results were far superior to conventional imagery. However, one concern was that the phase slope could not be measured as accurately as desirable, in particular if the process were to be automated.

The next possibility investigated was that of overcoming this possible limitation by adding to the data in each range gate an artificial strong scatterer with a Doppler offset. This has the consequence of translating a linear phase slope into a sinusoidal variation, with the frequency of the sinusoid indicative of the phase slope, and hence of the Doppler position of the associated scatterer. This approach also was unsuccessful. However, a further investigation led to the conclusion that the same objective could be achieved in a simpler manner by the following processing method.

One treats the data as if conventional SAR imagery were to be performed. However, then one does not use the long processing times required to obtain the desired degree of Doppler, or cross range, resolution, because of the problems discussed earlier. Instead, one uses a rather short processing time, perhaps 10% of what would be used for SAR imagery. Whenever a linear phase segment occurs in a given range gate, the short processing time will lead to a clean response, whose Doppler position will indicate the short processing window, the Doppler response will be so broad that Doppler resolution is useless for the purpose on hand. However, since a linear phase segment occurs only when one scatterer becomes predominant, no Doppler resolution is needed. One still can determine the Doppler position of the response peak to a small fraction of the response width, and this provides the requisite measurement accuracy.

In practice the situation is more complex. Although one scatterer may be predominant, other scatterers will be interfering. If a second scatterer is present, it will introduce an essentially sinusoidal modulation into the linear phase of the dominant scatterer, and this will cause a meandering back and forth of the Doppler history of the dominant scatterer. The mean Doppler of the Doppler history will give the Doppler of the dominant scatterer and the frequency of the meandering will be the Doppler offset of the interference scatterer.

If a third scatterer is significant, it will likewise introduce a phase modulation corresponding to its Doppler offset, and will modulate the Doppler history of the dominant scatterer. There was no time available under this program to develop the theory fully. Intstead, at most a second interfering scatterer was considered. If the situation is more complicated, this will be evident from the processing results, in which case one simply does not perform the measurement. In other words, this program simply used the processor output only for those segments where its interpretation was evident. Although this may be considered only a first usage stage in the full utilization of the information in radar returns. it will be seen that this simple procedure was amazingly successful. Again, note that it was not investigated whether the same procedure also could be used on moving vehicles.

5.3 Processing Results for the Stationary Tank

One important question concerns the choice of the coherent processing time, or the window length. As was explained above, the window length cannot be too large, because one then would "average" over different scattering centers, rather than resolve the scattering centers. On the other hand, if the processing window is too short, the accuracy with which the Doppler position of a response peak can be measured will be poor, and so will the image quality.

As an example, consider the processing time of 0.3 sec used in FIGS. 4 to 8. With Hamming weighting for Doppler sidelobe suppression, the 3 dB response width will then be 4.5 Hz. It is reasonable to assume that the peak position can be measured to about one-thirtieth of the 3 dB, width, which would be 0.15 Hz. The width of the tank was stated to be 38.8 Hz in computer units, which would be 38.8/15.84=2.4 Hz in actual frequency units. A measurement error of 0.15 Hz thus would correspond to 0.15/2.4=6.0% of the tank width, or 22 cm. Since the measurement accuracy of one-thirtieth of the 3 dB width may be optimistic, and a 6% error is larger than desirable, we have used a processing time of 0.6 sec for forming the image. Note, however, that this processing time was selected without any analysis of the problem of optimizing the processing time.

With a processing time of 0.6 sec, there was then calculated in the computer the same type of Doppler plots as shown in FIGS. 4 to 8 and the computer plotted the position of the highest peak in each frame (the plot was done in range rate coordinates rather than Doppler, with range rate converted into Doppler by division by $9.42\times10^{-4}$). To convert range rate into actual cross range, one must use the multiplication of 94.6. The following examples illustrate how the two-dimensional image was formed.

Figure 12:
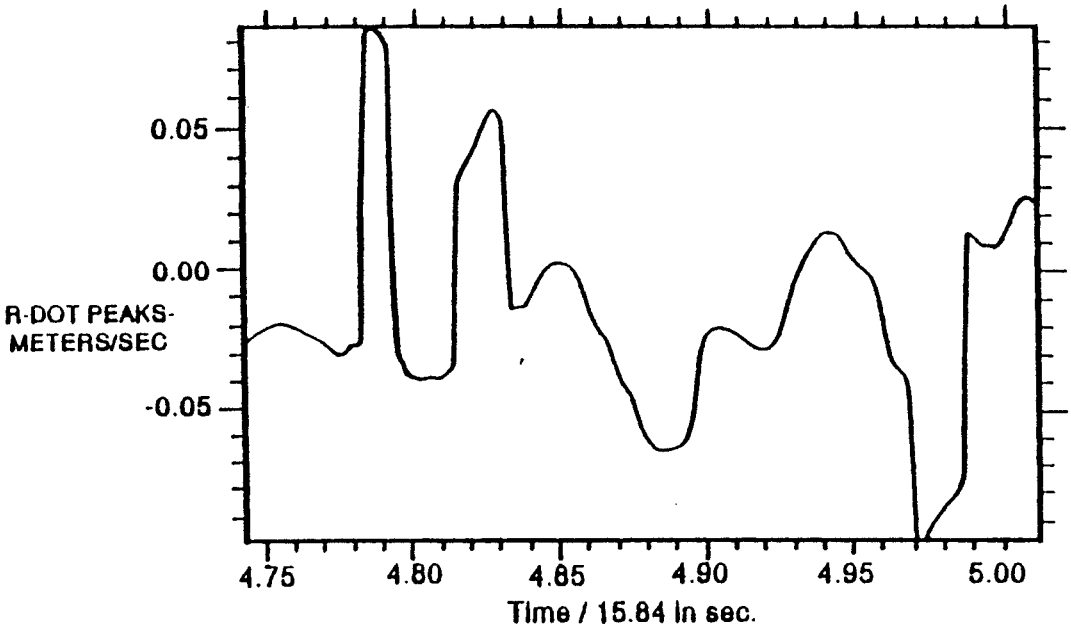
FIG. 12 is a graph showing range rate for response in gate 4.877 m, (tank)

FIG. 12 shows the range rate curve for Gate 4.877 m, which is the gate of FIG. 4. The discontinuous nature of the curve implies that there is no usable scatterer. The gate is thus considered empty.

Figure 13:
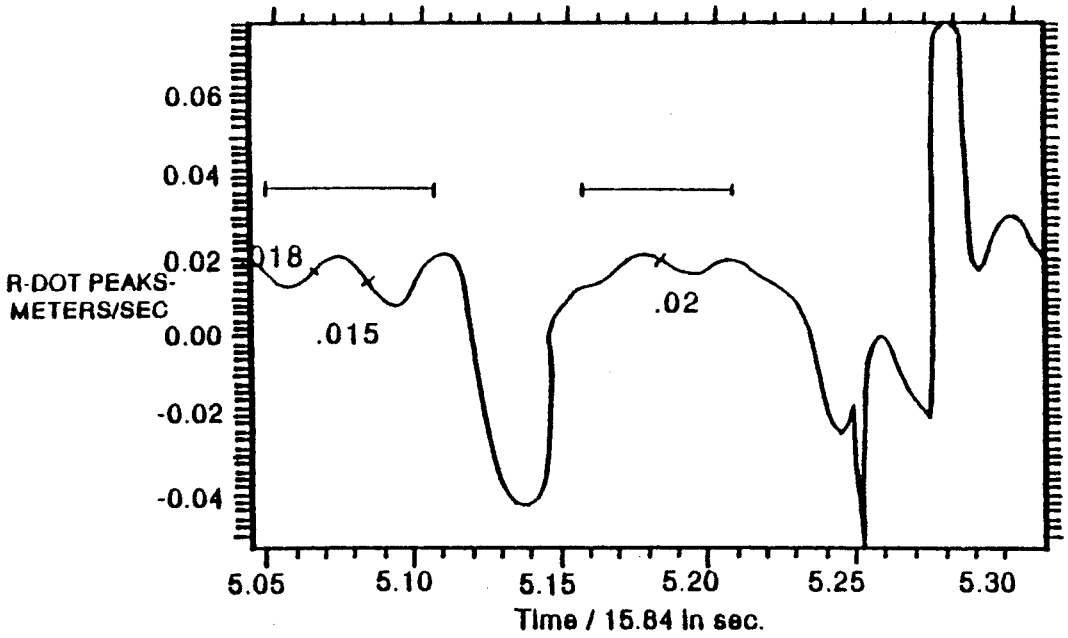
FIG. 13 is a graph showing range rate for response in gate 5.18 m, (tank)

Next, in FIG. 13 is shown the corresponding range rate curve for Gate 5.18 m, the gate of FIG. 5 and the first one containing a measurable return from the tank. Only two segments of smooth behavior are seen in the plot, as marked in the figure. One simply reads the coordinates of the points halfway between maxima and minima, as marked. By multiplying the three coordinates of 0.018 and 0.015, and 0.02 m/sec by the conversion factor of 94.6 we obtain three cross-range coordinates of scatterers: 1.70, 1.42, and 1.89 m. These scatterer positions then are plotted for Gate 5.18 m. There will be no attempt to utilize the modulation in the curve of FIG. 13 for locating additional scatterers because for the first range gate containing any tank return these additional weak scatterers are likely to be clutter.

Figure 14:
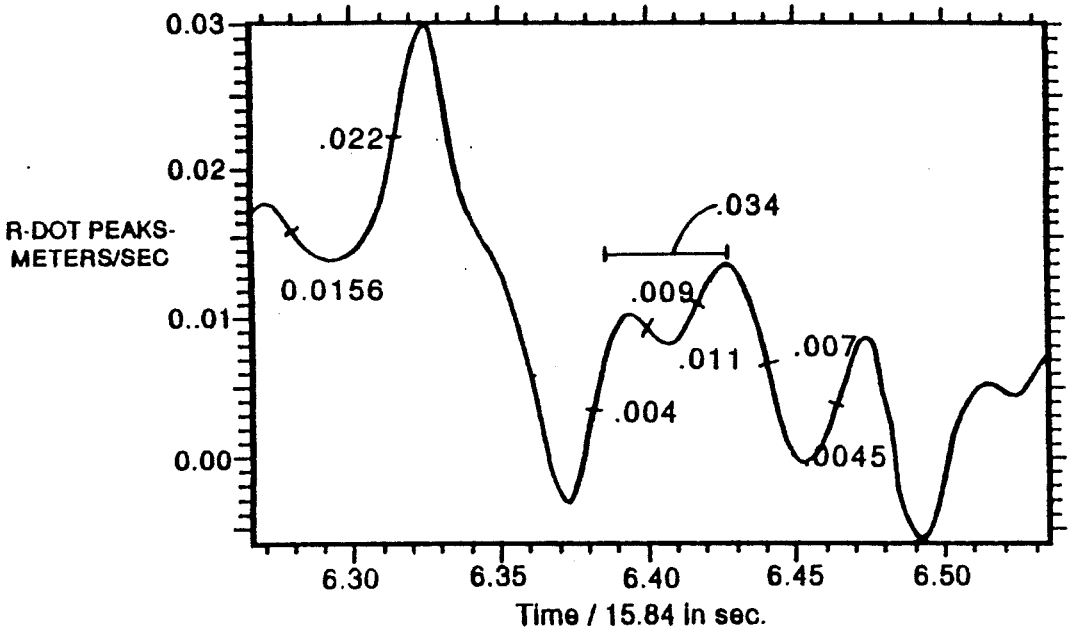
FIG. 14 is a graph showing range rate for response in gate 6.4 m, (tank)

FIG. 14 gives the plot for Gate 6.4 m (also of FIG. 6). The curve is smooth throughout the entire observation interval. It should not be used toward the end, where the data have the phase jump problem discussed earlier. One may also not want to use the curve where it changes over a large interval, because there may be an accuracy problem. Otherwise one simply marks the halfway points and converts range rate to cross range, as before. In the figure there is also marked a modulation period of 0.034 sec, which corresponds to a Doppler difference of 1/0.034=29.4 Hz. By multiplication with 0.0929 this is converted into a cross-range difference of 2.73 m. The average between the two range-rate readings over this period is 0.01/m/sec, which by multiplication with 94.6 converts into a cross range of 0.95 m. The direction of the second scatterer, whether it is to the left or right of the dominant scatterer, could be determined by analyzing the amplitude/phase plot of the gate. For simplicity, one simply argues here that if it were counted to the right, it would fall by a large margin outside the boundaries of the tank. Thus, one takes the displacement negative at −2.73 m, which places the scatterer at −2.73+0.95=−1.78 m. If the procedure were repeated with the modulation period to the right of the one marked in FIG. 14, another scatterer would be found, and it also would be within the boundaries of the tank. We have attempted to map all scatterers.

Figure 7:
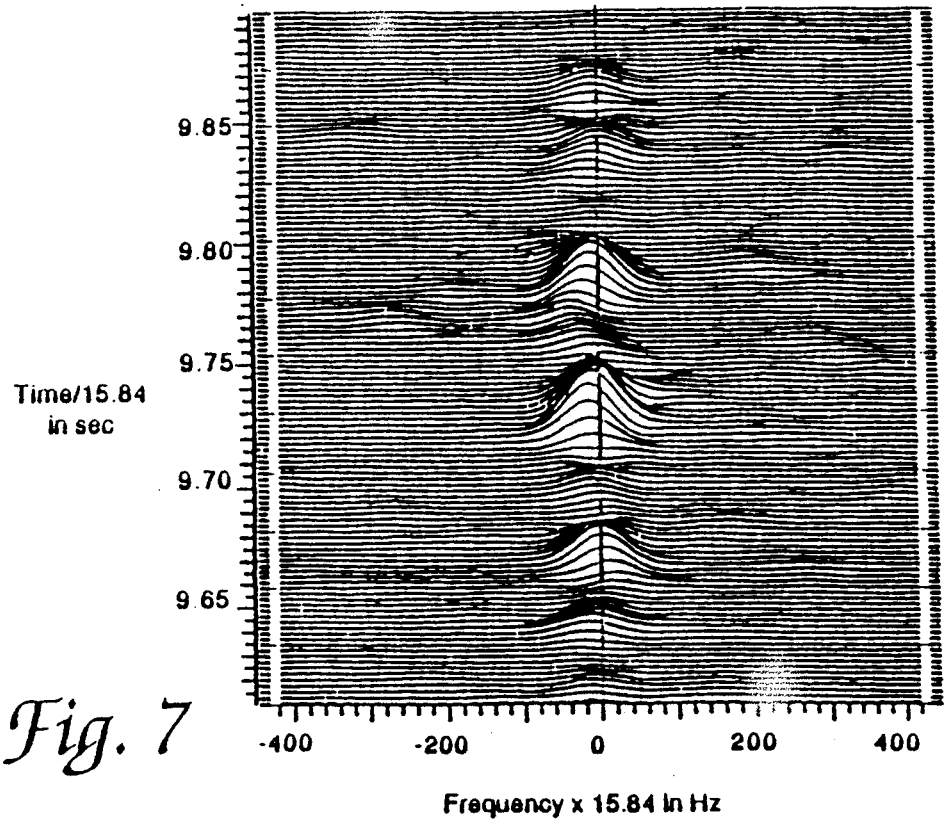
FIG. 7 is a graph showing a doppler plot for gate 9.753 m, (tank)
Figure 8:
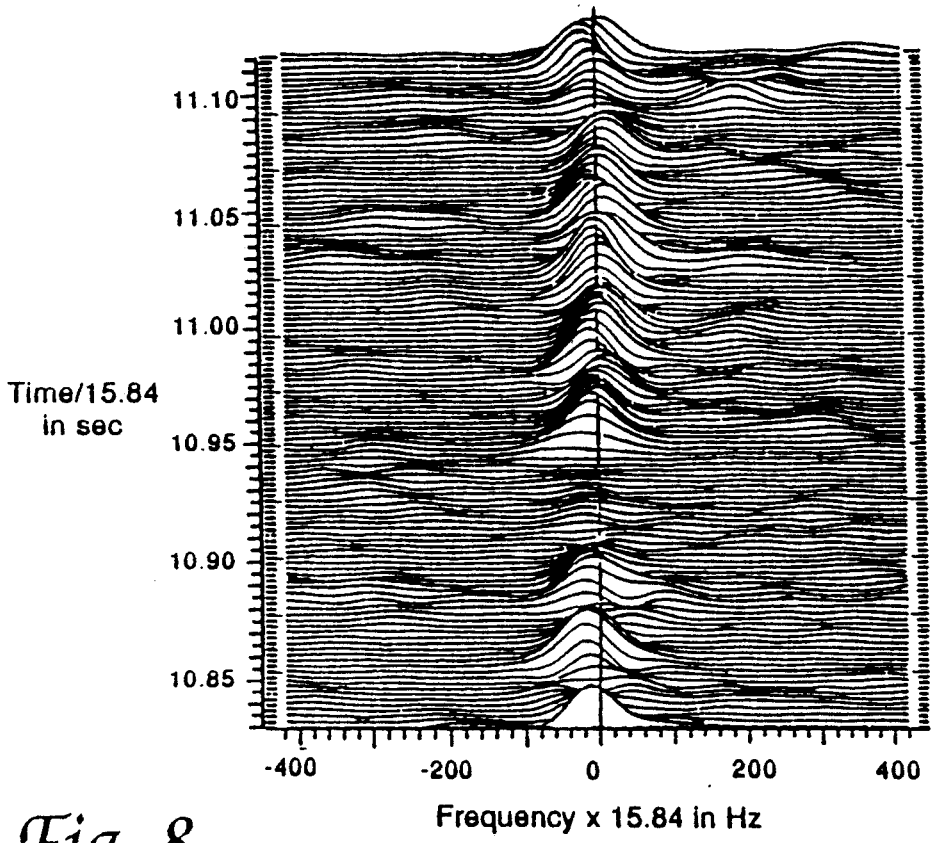
FIG. 8 is a graph showing a doppler plot for gate 10.97 m, (tank)
Figure 15:
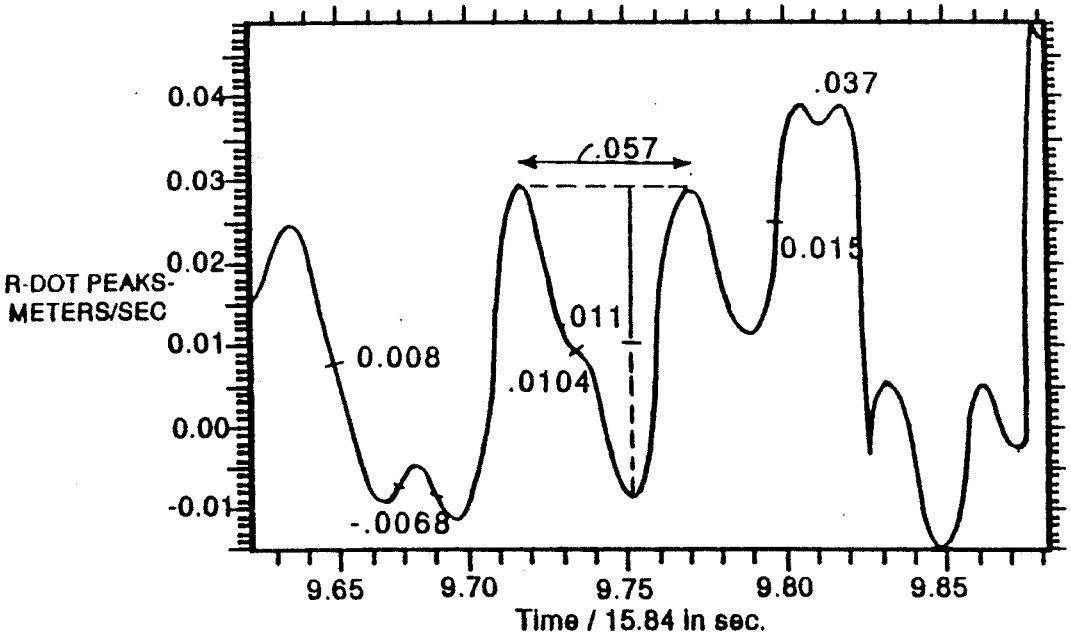
FIG. 15 is a graph showing range rate for response in gate 9.753 m, (tank).

The last example is given by FIG. 15 for Gate 9.753 m, the same gate as for FIG. 7. The same rules are followed for deriving the position of scatterers as illustrated above. The rules evidently are rather crude, and in all likelihood could be refined with further study. However, the coarseness of the rules also implies that automation of the analysis would be relatively simple.

The result of processing all range gates and performing the indicated measurements is given by FIG. 3. It is evident that the method has led to a relatively accurate definition of the overall size and shape of the vehicle (the object next to the tank again is the corner reflector, which appears to be resolved by the radar). The measured scatterer locations often coincide with actual discontinuities on the tank. However, the processing method would be expected to show the shifting scattering center on smooth surfaces as the aspect angle is changing because of the platform motion. No matter how much the processing is improved, one will always expect the speckled image familiar from coherent light. It is interesting to note that the image appears to reproduce correctly the offset machine gun on top of the turret, whereas the main gun has not appeared with this type of processing. This may be due to differences in the surface roughness. The machine gun might not have as smooth a barrel as the main gun. This point has not been investigated further.

For comparison, note the image that would be obtained with conventional SAR processing. For a better comparison with FIG. 3, it is desirable to change the method of presentation somewhat from that used earlier. First, if a response peak extends over several range gates, there will be plotted in the image a response in every range gate, and not just in the gate where the response is strongest. Second, in order to distinguish between meaningful responses and spurious responses introduced by the smearing of the major responses, bigger circles are used for the major responses and smaller circles for minor responses or, perhaps, spurious responses.

The result is shown in FIG. 1. If one considers for the moment only the major responses indicated by the larger circles, one observes the typical L-image of stationary tanks. The smaller circles help somewhat to fill out the image, but not much. A coparison with FIG. 3 shows that the stationary tank is much less well defined than with out modified processing approach. One cannot obtain the overall dimensions with acceptable accuracy from FIG. 1 and identification of the type of tank appears impossible. It would require the comparison with images from trucks to determine whether the L-shape characteristics of the image even permit relitable discrimination between trucks and tanks.

Section 5 of the technical report ends here.

COMPUTER PROGRAM

A copy of a "FORTRAN Listing of Computer Code for Algorithim Execution" (MRI 186-21A) is attached hereto as an appendix, and an explanation thereof follows.

When scatterers have highly lobed backscattering patters a particular scatterer may dominate the radar signal from a target for only a short time. During that interval the slope of the phase function indicates the cross-range position of the dominant scatterer. Below is described an automated algorithm for finding and measuring phase slopes corresponding to scatterer locations.

The program begins with the unwrapped phase function of the return signal for a specific range gate. This is the phase function generated by taking the phase measured for each pulse and, if necessary, adding or subtracting a full phase cycle in order to minimize the phase change from one pulse to the next. The duration of the signal is normalized to one second. The program then locates jumps in the phase and uses them to define breakpoints, the limits of time intervals which correspond to dominance of particular scatterers.

The program searches the phase function for points of extremal curvature (there will be an extremum on each side of a phase jump) with curvatures of magnitude greater than SCHNG (default value 0.3 cycles/-sec/sec; although default values given throughout this description have been derived through applicatoon of this algorithm to a variety of data sets, optimal values for any particular data may vary). If the phase difference at the extremal points is greater than PJMP (default value 0.23 cycles) and the corresponding amplitude function has a minimum between the times of the extremal phase curvatures then a phase jump is said to have occurred. An amplitude minimum is accepted only if the the amplitude at the minimum is less than AMPIN (default value 0.15) times the amplitude of the first amplitude peak after the minimum under consideration. When a phase jump occurs the extremal points surrounding it are taken as breakpoints.

Each segment resulting from the above step is considered for further segmentation. A linear least-squares fit is made to the phase of each segment. No further segmentation is done to segments of duration less than SEGMIN (default 0.00093 sec), segments of duration less than PJSEGLN (default 0.04 sec) with fewer than NMBREXT (default 3) residual extrema in the difference between the fit line and the phase, and segments of duration less than PJSEGLN with fewer than two amplitude extrema and a standard deviation about the fit less than SDMIN (default 0.015 cycles).

Remaining segments are searched for deviation from linearity. Additional breakpoints are added at points of maximal deviation. The first additional breakpoints are assigned through a multiple (per segment) breakpoint assignment algorithm, as follows. The intersection points of the fit line and the phase are found. Breakpoints are assigned between these intersection points at the times of maximal deviation between the line and the phase, if this deviation is greater than 0.25 cycles.

Linear least-squares fits are made to the phases of the resultant segments. If the maximum deviation between the fit line and the phase occurs at eh end of a segment, and is greater than ED (default value 0.14 cycles), the end point is dropped from consideration for phase slope measurement and a breakpoint is assigned at the new segment endpoint. If the maximum deviation occurs away from the segment endpoints, and is greater than CD (default value 0.17 cycles), an additional breakpoint is assigned at the point of maximum deviation. Whenever a new segment is defined a linear least-squares fit is made and deviations are examined. Breakpoints are assigned and the process iterated until all deviations are less than ED and CD.

The resultant segments are examined for compliance with criteria which indicate a single dominant scatterer, measured with sufficient accuracy over a long enough duration so that the phase slope corresponds to the scatterer cross-range location. The first criterion is that an acceptable segment have a phase slope between MNSLOPE and MXSLOPE (settings supplied be the user should correspond to the image size unless target limts are known, or devived by a related algorithm). An acceptable segment must also have minimum length MSL (Default 012 sec). Any segment with length greater than SLL (default value 0.33 sec) is accepted without further testing.

Candidate segments shorter than PJSEGLN with either a phase jump break at an endpoint or with NRE (default 3) or fewer residual extrema in the difference between the phase and the fit line are rejected. Segments with a standard deviation of the phase about the fit line greater than MAXSD (default 0.07 cycles) are rejected, as are segments with a standard deviation less than MINSD (default 0.01 cycles) and fewer that two amplitude maxima.

Segments which have not been eliminated by the above tests are accepted. Their phase slopes indicate scatterer crossrange locations. The above procedure also may be applied to the return spectrum for a specific cross-range gate. In that case the measured phase slope indicates the range location of a scatterer dominant for part of the radar bandwidth.

It is understood that certain modifications to the invention as described may be made, as might occur to one with skill in the field of the invention, within the scope of the appended claims. Therefore, all embodiments contemplentated hereunder which achieve the object of the present invention have not been shown in complete detail. Other embodiments may be developed without departing from the scope of the appended claims.

The computer program listing follows.

```
      subroutine subphseg (amp,phz,time,npts,ind1,ind2,segst,nseg,
     *          isegap,words,istim,ietim,modeph,anbyt,ImageD,nzero,
     *          sptyp,altitude,range,alt,rang,aphfin,iseg,
     *          StartX,origX1,OrigDX,slpc,AmpScal)

c  segx variables are offsets from the starting segment number specified
c  as segst by the calling routine
      character*1        anbyt, altitude, range
      integer segstib,segsteb,segf,segstsb,sptyp
      integer segstibO, segfO, segstsbO
      real     alt(*),rang(*),slpc,msw
      character*61       ptitle
      character*5        com(4),chose
```

```
      character*60        pexp(4)
      character*1         subttl
      character*38        Title
      character*1         image,AmpScal
      character*1         ialgl,ialg2,ralgl,valgl,valg2
      logical             imageD
      character*5         parcom(6),par
      character*60        parexp(6)

cc location code
      character*10        locode

C  declaration fpr PHSEG
      Real*4  WORDS(4),MD,phz(4097,2)
      Real*4  Tim(*),AMP(*),PH(4097)
      INTEGER MINS (1024),MAXS(1024),IBS(1024)
      INTEGER DS(9,1024)SS(2,1024),DP,TSO(1024),TSPO,SP,SBS(1024)
      INTEGER OSP,SBP,MNMXS(1024)
      INTEGER SSS(2,1024),SSP,START
      CHARACTER*129       APHFN
      LOGICAL*4           PLTDEC
      INTEGER FRNGl,FRNG2,NMBREXT
      LOGICAL*4           AMODE, APPLOT
      REAL                AMPTH,PJUMP,SCHNG,MAXCD,SEGMIN,LONGSEG
                          PJSEGLN,SDMIN,SDMAX,SDSEG
      EQUIVALENCE         (DP,SP)
C COMMONS for PHSEG
      COMMON/CONST/PI,TPI,FPI
      COMMON/CONTIG/STRTM,ENDTM,XLEN,PHSLEN,AMPLEN,PAUSE,HRDCPY
      COMMON/MNMAX/MNMXP,MNMXS
      common/location/locode
      data                parexp/'set Intitial break parameters',
     *                    'set Regular break parameters',
     *                    'set Validation parameters',
                          'set Operation parameters',
                          'set ASM image plotting parameters',
                          'Exit parameter menu'/
      data        segstibO/O/,segstebO/4/.segfo/l/
      data        segstbO/7/
      data                parcom/'I','R','V','O','ASM','[Esc]'/
      Data        Title/'AUTOMATIC PHASE SEGMENT DETECTION MENU'/
      data        pexp/'go do the Automatic phase segment detection'/
                          'Parameters', 'Spool','Exit'/
      data        com/'A','P','S','[Esc]'/,subttl/' '/
      data        ptitle/'PARAMETER SPECIFICATION FOR AUTOMATIC PHASE SEGM
*ENT DETECTION'/
      data                inalgl,ralgl,valgl,ialg2,ralg2,valg2
     *                          /'Y','Y','Y','N','N','N','N'/
C  include data block for PHSEG
      DATA SSPOLD,SSP/O,O/,YESl/l./,START/l/
      DATA XF,YF,MX,MY,KPT/.3,.3,2500,1800,0/,ABKS,APHS/0.,0./
      DATA MD/0.0/
      data SP,SBP/0.0/
      DATA LUNABK,NDIM/13,4096/,MAXCD/.17/
      DATA PLTDEC/.TRUE./
      data        applot/.true./,amode/.true./
      data IMAGE/'N'/
      DATA AMPMIN/.15/,PJUMP/.23/,SCHNG/.3/,MAXED/.14/
      DATA FRNGl,FRNG2,SLPMIN,SLPMAX/44,84,-13.,13./
      DATA MINSMP,SDMIN/,5.015/
      DATA SDSEG,SDMAX /.025,.07/,LASTI/l/
      DATA NMBREXT/3/
      data SEGMIN/.2/
      data LONGSEG/.16/
      data PJSEGLN/.04/
```

```
c "invisible' refresh from ISAP
      Call plenter
      call segvis(iseg+9.0)
      call segvis(iseg+22,0)
      call segvis(iseg+35,0)
      call xmit (4097,phz(1,modeph),ph)
      if (ind1.le.0.or.ind2.le.0.or.ind1.eq.ind2) then
          ind1 = istim
          ind2 = ietim
          end if
5     continue
c  starting plot segments for:  intitial, end, suggested breaks and fit
      segstib = segstib0 + segst
      segsteb - segsteb0 + segst
      segstsb = segstsb0 + segst
      segf = segf0 + segst
10    call plexit
      locode = 'phsegml'
      call menu(title,com,pexp,4,' ',.false.,.false.,chose,subttl)
      if(chose.eq.com(2) then
12        locode = 'phsegp2'
          call menu(ptitle,parcom,parexp,6,' ',.false.,.false.,par,
     *       subttl)
          if(par.eq.parcom(1)) then
             call inipar(ialg1,ampin,pjump,schng,ialg2,apr,sdap,
     *                 msw,af)
          else if(par.eq.parcom(2)) then
             call regpar(maxcd,maxed,ralg1,ralg2)
          else if (par.eq.parcom(3)) then
             call valpar(nmbrext,segmin,lonseg,sdmin,sdmax,
     *                   slpmin,slpmax,valg1,valg2)
          else if (par.eq.parcom(4)) then
             call oppar(amode,applot)
          else if(par.eq.parcom(5)) then
             call asmpar(image,frng1,frng2)
          end if
          if(par.eq.'[Esc]') goto 10
          goto 12
          end if
      if(chose.eq.com(3))then
          call phspl(aphfn,words,tim,amp,phz,istim,ietim,isegap
     *       modeph,tim(istim),tim(ietim),ind1,ind2,anbyt,imageD
     *       nzero,sptyp,altitude,range,alt,rang,ds,ss,sp,StartX,
     *       OrigX1,OrigDX,slpc,segstib,AmpScal)
          goto 10
          end if
c bring back the basic amp-phase plot
      Call Plenter
      Call plot(o.,o.,32)
      if(chose.eq.com(4))
     *    call segvis(-1.0)
      call rstrplt(isegap)
      call plbias(slpc,imageD,sptyp,OrigX1,StartX,OrigDX)
      if(chose.eq.com.(4)) then       !exit phseg back to ISAP
          call segvis(iseg+9.1)
          call segvis(iseg+22.1)
          call segvis(iseg+35.1)
          return
          end if
C INITPASS1 contains variable initiations to be performs
C for each pass pf the program
      OSP=0
      minp = 0
      maxp = 0
      mnmxp = 0
```

```
      SSPOLD=0
      IBP=1
      Call XMITI(-SSP*2,0,SSS)
      sp = 0
      SSP=0
      START = 0
      SS(1,1)=ind1
25    continue
CCCCCCCCCCCCCCCCCCCCCCCCCCCCCCCCCCCCCCCCCCCCCCCCCCCCCCCC
C!!!!!!!!!!!!!!!!!!!!!!!!!!!!!!!!!!!!!!!!!!!!!!!!!!!!!!!!C
C                START PHSEG PROCESSING                 C
C!!!!!!!!!!!!!!!!!!!!!!!!!!!!!!!!!!!!!!!!!!!!!!!!!!!!!!!!C
CCCCCCCCCCCCCCCCCCCCCCCCCCCCCCCCCCCCCCCCCCCCCCCCCCCCCCCC

Call plenter

C AMPEXT gets the extrema from the amplitude
      Call AMPEXT (AMP,NPTS,IEtim-1,IStim+1,MINS,MAXS,
*             MINP,MAXP)

c  find initial breaks
      call getib(amp,ph,tim,istim,ietim,mins,minp,pjump,schneg,tsO,
     *    tspO,maxs,maxp,ibs,isp,ampth,apr,sdap,msw,af,ialg1,ialg2)

C plot initial breks
      IF (APPLOT) CALL PLTIB(Tim,IBS,IBP,OSP,segstib)

c find and plot regular break (segments)
      call getrb(amp,ph,tim,ss,sp,ibs,ibp,isseg,ieseg,
     *        sfit,phOfit,ds,dp,maxs,maxp,sdmin,amode,segmin,
     *        nmbrext,pjsegln,maxcd,lonseg.sbs.sbp,deltat
     *        applot,segstsb,maxed,segsteb,ralg1,ralg2)

C validate segments
      Call VALSEG (amp,ph,ss,ds,sp,slpmin,slpmax,SDIM,SDMAX,SDSEG,TSO
     *    TSPO,MAXS,MAXP,SEGIM,LONGSEG,PJSEGLIN,NMBREXT,valg1,valg2)

C plot slope and deviation values on amp-phase plot
          IF (APPLOT) CALL PLTNMBR (Tim,SS,DS,SP)
          call plot (O.,O.,3)

      goto5
      END
          SUBROUTINR AMPEXT (AMP,NPTS,IBEG,IEND,MINS,MAXS,MINP,MAXP)
C
C  find extrema indices between IBEG and IEND
C  AMP is the data array of NPTS elements.  IBEG and IEND are the
C  processing limits.  MINS stores the minima indices whiles MAXS
C  stores the maxima indices.  MINP and MAXP are the number of elements
C  in MINS and MAXS, respectively. IDIR indicates the direction to
C  search
C
      Real  AMP(*)
      INTEGER MINS(*),MAXS(*),MNMXS(1024)
      COMMON/MNMAX/MNMXP,MNMXS

          IDIR=-1
          MAXP=0
          MINP=0
          MNMXP=0
          IF(IBEG.EQ.NPTS) IBEG=NPTS-1
          IF(IBEG.EQ.1) IBEG=2
          IF(IBEG.LT.IEND) IDIR=1
C                 Type*,'AMPEXT:  Wrong direction for IBEG'
C                 RETURN
C                 END IF
```

```
      IT=IBEG
10    CONTINUE
c     NIT=NXTEXT(AMP(min(ibeg,iend)).NPTS,IT - min(ibeg,iend),IDIR)
c  find next extrema in data array amp
      NIT=NXTEXT (AMP,NPTS,IT,IDIR)
      IF(ABS(NIT).GT.IEND.AND.IDIR.EQ.1) RETURN
      IF(ABS(NIT).LT.IEND.AND..DIR.EQ-1) RETURN
      IF(NIT.E.O) RETURN
C  update minstack
      IF(NIT.GT.O) THEN
          MINP=MAXP+1
          MINS(MINP)=NIT !+ min(ibeg,iend) - 1
          END IF
C  update maxstack aray
      IF(NIT.LT.0) THEN
          MAXP=MAXP+1
          MAXS(MAXP)=ABS(NIT) !+min(ibeg,iend) -1
          END IF
C update extrema stack
      IF(NIT.NE.0) THEN
          MNMXP=MNMXP+1
          MNMXS(MNMXP)=ABS(NIT) !+ min(ibeg,iend)
          END IF
      IT=ABS(NIT)
      IF(IT.LE.IEND) RETURN
      GOTO 10
      END
      subroutine getib (amp,ph,tim,isdat,iedat,mins,minp,pjump,
*         schng,ts0,tsp0,maxs,maxp,ibs,ibp,ampth,apr,sdap,
*         msw,af,alg1,alg2)

cccccccccccccccccccccccccccccccccccccccccccccccccccccccccccccccc
c                        subroutine getib
c
c getib gets the initial breaks for the various initial break algorithms
c used in ISAP.  any or all of the algorithms may be used by setting
c ialgn ='Y' (n = 1, 2 etc.)
c algorithm 1 is the original one devised by Peter which finds initial b
c at locations where amplitude nulls and phase jumps occur
c algorithm 2 was developed by Steve H and is intended to find segments
c surrounding amplitude peaks.
c algorithms 1 and 2 should not be run together.
c
c    written by Dean Myerson 12-86
cccccccccccccccccccccccccccccccccccccccccccccccccccccccccccccccc

      real   amp(*),tim(*),ph(*),pjump,schng,ampth,apr,sdap,msw,af
     integer maxs(*),maxp,ibs(*),ibp,mins(*),minp,ts0(*),tsp0
     integer isdat,iedat,npts
     character*1     alg1,alg2

      if(alg1.eq.'Y'0)then
C  PJUMP gets initial phase jump breaks
          CALL PJUMP(PH,isdat,IEDAT,MINS,MINP,PJUMP,SCHNG,TSO,TSPO)

C  ANULLB gets more initial breaks from amp minima
          CALL ANULLB(AMP,MAXS,MAXP,IBS,IBP,TSO,TSPO,MINS,MINP,AMPTH)

C  include last data more on the initial break stack
          CALL ISBEND(IBS,IBP,IEDAT)
      end if

      if(algs.eq.'Y')then
          npts = iedat - isdat + 1
c  first step:  delete peaks that are not the highest in the region cent
```

```
c  around them with a width of apr seconds
          call delapk(amp,tim,maxs,maxp,apr,isdat,iedat)

c  second step:  delete peaks whose second derivative is less then sdap
          call amp2d (amp,maxs,maxp,sdap)

c  sort all peaks so that highest is first
          call ampsrt (amp,maxs,maxp)

c  determine location of initial breaks
          call setib (amp,tim, maxx,maxp,msw,af,ibs,isdat,iedat)
      end if

      return
      end
          SUBROUTINE PJUMP(PH,Nst,nend,MINS,MINP,PJUMP,SCHNG,TSO, TSPO)
C
C  routine to find phase jumps in region around amp nulls
C
C    PH   -phase array
C    nst  -first index
C    nend -last index
C    MINS -array of amp null indices
C    MINP -size of MINS
C    PJUNP-minimum ohase excursion for a phase jump
C    TSO  -integer array of phase jump breaks
C    TSPO -size of TSO
C
          REAL   PH(*),D2(4096)
          INTEGER MINS(*),TSO(*),TSPO
          LOGICAL USEBRKS,CHKJMP

          nph = nend-nst+1
          TSPO=0
C  create array of phase double derivatives
      DO 99 L = nst + 1, Nend-1
          D2(L)-DD(PH,L)
99    Continue

      DO 98 K=1,MINP
          INDEX=MINS(K)
          IBRKMID=0
          IF ((D2(INDEX+1)-D2(INDEX)).EQ.O.OR.(D2(INDEX)-D2(INDEX-1))
              .EQ.O) GOTO 40
C  see if there is a 2D phase peak right on the amp null
          IF (ABS(D2(INDEX)-D2(INDEX-1)/(D2(INDEX)-D2(INDEX-1)).NE.
          ABS(D2(INDEX+1)-D2(INDEX))/(D2(INDEX+1)-D2(INDEX)))
                IBRKMID=INDEX
C  get nearest 2D phase absolute maxima in each direction
          INDEXX=INDEX
          IBRKLT=ABS(NTEXT(D2(nst),NPH-2,INDEXX,-1))
          IBRKRT=ABS(NTEXT(D2(nst),NPH-2,INDEXX,1))
          IF(IBRKLT.EQ.O.OR.IBRKRT.EQ.O.) GOTO 40
          IF (IBRKMID.EQ.O.) GOTO 20
C    choose which side break to use
          IRTDIF=IBRKRT-INDEX
          ILTDIF=INDEX-IBRKLT
          IF (IRTDIF.LT.ILTDIF) THEN
               IBRK1=IBRKMID
               IBRK2=IBRKRT
           ELSE
               IBRK1=IBRKLT
               IBRK2=IBRKMID
               END IF
           GOTO 30
```

```
20    CONTINUE
C    if 1 side break doesn't exist and center does:
          IF(BRKRT.EQ.O.OR.IBRKLT.EQ.O) GOTO 40
          IF (IBRKRT.EQ.O) THEN
               IBRK1=IBRKLT
               IBRK2=IBRKMIN
               END IF
          IF (IBRKLT.EQ.O) THEN
               IBRK1=IBRKMID
               IBRK2=IBRKRT
               END IF
C  no 2D phase peak at amp null so use those on each side
          IBRK1=IBRKLT
          IBRK2=IBRKRT
30        CONTINUE
C  see if phase excursion between 2D phase beaks is large enough
          USEBRKS=CHKJMP(PH,PJUMP,SCHNG,IBRK1,IBRK2)
          IF(.NOT.USEBRKS) GOTO 40
          TSO(TSPO+1)=IBRK2
          TSO(TSPO+2)=IBRK1
          TSPO=TSPO+2
40        CONTINUE
98    Continue
      RETURN
      END
          SUBROUTINE ANULLB(AMP,MAXS,MAXP,IBS,IBP,TSO,TSPO,
     *            MINS,MINP,AMPMIN)

C  control routine for finding amplitude null initial breaks
C
C    AMP                  -amplitude array
C    MAXS                 -amplitude maxima stack
C    MAXP                 -pointer for MAXS
C    TSO                  -already existing (phase) initial breaks
C    TSPO                 -pointer for TSPO
C    MINS                 -amplitude minima stack
C    MINP                 -pointer for MINP
C    AMPMIN               -multiplicative factor for amplitude null breaks
C
      INTEGER MAXS(*),TSO(*),MINS(*),TSP1,TS1(1024),TS2(1024),TSP2
          INTEGER TS(1024),TSP,IBS(*),IBP,TSPO,TSPOL
          REAL    AMP(*)

C  save stack pointer; L suffix indicates local
      MINPL=MINP
      MAXPL=MAXP
      IF(MINS(MINP).LT.MAXS(MAXP)) MINP=MINP-1
      TSPOL=TSPO
      TSP1=0
      IDIR=1
5     CONTINUE

C  get next amp max and set new reference
      INDEX=MAXS(MAXPL)
      REF=AMP(INDEX)

10    CONTINUE

      NXTMIN=MINS(MINPL)

C if minima passes a phase jump break, rest the amp reference
      IF (TSPOL.LE.O.OR.TSPOL) GOTO 14
      IF (IDIR.EG.1.AND.NXTMIN.LT.TSO(TSPOL)) GOTO 14
      IF (IDIR.EQ.-1.AND.NXTMIN.GT.TSO(TSPOL)) GOTO 14
          MAXPL=MAXPL-IDIR
          MINPL=MINPL-IDIR
```

```
C skip all phase break which have been passed
11          CONTINUE
            TSPOL=TSPOL-IDIR
            IF(TSPOL.LE.O.OR.TSPOL.GT.TSPO) GOTO 12
            IF(IDIR.EQ.1.AND.NXTMIN.LT.TSO(TSPOL)) GOTO 11
            IF(IDIR.EQ.-1.AND.NXTMIN.LT.TSO(TSPOL)) GOTO 11
12          CONTINUE
            IF(MAXPL.LE.O.OR.MAXPL.GT.MAXP) GOTO 99
            IF(MINPL.LE.O.OR.MINPL.GT.MINP) GOTO 99
            GOTO 5
14          CONTINUE

C if criteria is met, insert new break and reset the amp ref
      IF(AMP(NXTIM).LE.AMPIN*REF) THEN
            TSP1=TSP1+1
            TS1(TSP1)=NXTMIN
            MAXPL=MAXPL-IDIR
            MINPL=MINPL-IDIR
            IF(MAXPL.LE.O.OR.MAXPL.GT.MAXP) GOTO 99
            IF(MINPL.LE.O.OR.MINPL.GT.MINP) GOTO 99
            GOTO 5
            END IF
      MAXPL=MAXPL-IDIR
      IF(MAXPL.LE.O.OR.MAXPL.GT.MAXP) GOTO 99
      INDEX=MAXS(MAXPL)
C if new maxima passes phase jump break, reset the amp ref
      IF(TSPOL.LE.O.OR.TSPOL.GT.TSPO) GOTO 15
      IF(IDIR.EQ.1.AND.INDEX.GT.TSO(TSPOL)) GOTO 15
      IF(IDIR.EQ.-1.AND INDEX.GT.TSO(TDPOL)) GOTO 15
C skip all phase breal which have been passed
111         CONTINUE
            TSPOL=TSPOL-IDIR
            IF (TSPOL.LE.O.OR.TSPOL.GT.TSPO) GOTO 112
            IF (IDIR.EQ.1.AND.INDEX.GT.TSO(TSPOL)) GOTO 111
            IF (IDIR.EG.-1.AND.INDEX.LT.TSO(TSPOL)) GOTO 111
112         CONTINUE
            MAXPL=MAXPL-IDIR
            MINPL=MINPL-IDIR
            IF(MAXPL.LE.O.OR.MAXPL.GT.MAXP) GOTO 99
            IF(MINPL.LE.O.OR.MAXPL.GT.MINP) GOTO 99
            INDEX=MAXS(MAXPL)
            REF=AMP(INDEX
C           IF (TSPOL.LE.O.OR.TSPOL.GT.TSPO) GOTO 99
15    CONTINUE
      IF(AMP(INDEX).GT.REF) REF=AMP(INDEX)
      MINPL=MINPL-IDIR
      IF(MINPL.LE.O.OR.MINPL.GT.MINP) GOTO 99
      GOTO 10

99    CONTINUE
      IF(IDIR.EQ.-1) GOTO 100
C    perform in reverse direction
            MAXPL=1
            MINPL=1
            IF(MINS(1).GT.MAXS(1)) MINPL=MINPL+1
            CALL XMITI (TSP1,TS1,TS2)
            CALL XMITI (-TSP1,O,TS1)
            TSP2=TSP1
            TSP1=0
            TSPOL=1
            IDIR=-1
            GOTO 5
100         CONTINUE
            CALL SMERGE (TS,TSP,TSO,TSPO,TS1,TSP1,TS2,TSP2)
            CALL XMITI(TSP,TS,IBS)
            IBP=TSP
```

```
          RETURN
          END

          SUBROUTINE IBSEND(IBS,IBP,IESEG)
C
C routine to insert last data point onto bottom of IBS stack
C
      INTEGER IBS (*)

      DO 10 K=IBP,1,-1
          IBS(K+1)=IBS(K)
10    CONTINUE
      IBP=IBP+1
      IBS(1)=IESEG
      RETURN
      END
     subroutine getrb(amp,ph,tim,ss,sp,ibs,ibp,isseg,ieseg,
*           sfit,phOfit,ds,dp,maxs,maxp,sdmin,amode,segmin
*           nmbrext,pjsegln,maxcd,longseg,sbs,sbp,deltat,
*           applot,segstsb,maxed,segsteb,algl,alg2)

      real  amp(*),ph(*),tim(*),sfit,phofit,ds(9.*).sdim
      real  segmin,pjsegln,maxcd,longseg,deltat
      real  maxed,md
      integer       ss(2,1024),sp,ibs(*),ibp,isseg,ieseg,dp
      integer       maxs(*),maxp,nmbrext,sbs(*),sbp,segstsb
      integer       segsteb,mp
      character*1   algl,alg2
      logical       amode,applot,segtest,newbrk

cccccccccccccccccccccccccccccccccccccccccccccccccccccccccccccccccccccc
          subroutine getrib
c
c    getrb gets the regular breaks or segment to be validated later.
c    there are currently 2 algorithms for doing this.  the first was
c    developed by Peter C and involves end, center and multiple breaks
c    using phase deviation, the second was developed by Steve H and
c    merely uses the initial breaks determined earlier without
c    modification.  this subroutine is organized so that both
c    algorithms can be run.
c
c    written by Dean Myerson 12-1-86
cccccccccccccccccccccccccccccccccccccccccccccccccccccccccccccccccccccc

      integer sssold,sspold,sspt,ed,edleft,edright,neleft,neright
      character*1        ctype
      if(algl.eq.'Y') then
10        continue
C Find the next segment for processing
          CALL NEXTSEG(AMP,SS,SP+1,IBS,ISSEG,IESEG,SSSOLD,SSPOLD,
     *        SSPT)
          IF(IBP.EQ.O) return

C BRKTYP decides whether to call ENDBRK or CENBRK
          CALL BRKTYP (amp,PH,Tim,ISSEG,IESEG,SFIT,PHOFIT,ED,EDLEFT
     *   EDRIGHT,NELEFT,NERIGHT,MD,MP,CTYPE,DS,DP+1,maxs,maxp)

C test segments for length, number of extrema & smoothness
          IF(SEGTEST(PH,NEWBRK,MAXS,MAXP,ISSEG,IESEG,DS(4.DP+1),SFIT,
           SDMIN,AMODE,SEGMIN,NMBREXT,PJSEGLN,MD,MAXCD,LONGSEG))
                    GOTO 65

G give MULBRK a chance to find breaks before calling the other types
          CALL MULBRK (Tim,PH,AMP,ISSEG,IESEG,DS,DP+1,SBS,SBP,DELTAT,
     *       APPLOT,AMODE,NEWBRK,MAXCD,segstsb)
```

```
C if MULBRK found an acceptable break, goto UPDATE
          IF(NEWBRK) GOTO 65
          SBP=0

C ENDBRK controls processing for end breaks
          IF (CTYPE.EQ.'E') CALL ENDBRK (Tim,PH,AMP,ISSEG,IESEG,DS,
     *          DP+1,SBS,SBP,AMODE,NEWBRK,APPLOT,MAXED,ED,EDLEFT,
     *          EDRIGHT,SFIT,PHOFIT,NELEFT,NERIGHT,MD,MP,segsteb)
      SUBROUTINE MULBRK(TIME,PHASE,AMP,ISSEG,IESEG,DS,DP,SBS,SBP,
     *    DELTAT,APPLOT,AMODE,ACCBRK,segst)
C
C main control routine for multiple breaks
C
      REAL                TIME(*),AMP(*),PHASE(*),DS(9,*),MAXMD
      REAL                PDEV(1024),SD2(100),SD1(100)
      INTEGER             SBS(*),DP,SBP,segst
      LOGICAL             APPLOT,AMODE,ACCBRK
      Character*1         NEWBRK
C
C MULTDAT fills the data stack, DS, finds multiple breaks, if any,
C and computed the standard deviations for each subinterval
      CALL MULDAT(TIME,PHASE,AMP,ISSEG,IESEG,DS,DP,SBS,SBP,
     *       DELTAT,SD1,SD2,PDEV)
C inform user that no breaks were found
      IF(SBP.EQ.O.AND..NOT.ACCBRK.AND..NOT.AMODE) THEN
      CALL CCOUT (3,char(31),1)
      CALL PRINT7
      END IF

C if no multiple breaks were found, treat as ACCBRK=.FALSE.
      IF(SBP.EQ.O) THEN
          ACCBRK=,FALSE
          RETURN
          END IF

C PLTFIT plots the data to the plotiing terminal
      IF(APPLOT.AND..NOT.AMODE)
                CALL PLTLIT (TIME,ISSEG,IESEG,DS,DP, SBS,SBP,segst)

C DECIDE3 returns accepted multiple breaks in the SBS stack
      CALL DECIDE3(ISSEG,IESEG,DS(1,DP).DS(2.DP).SBS.SBP.TIME
     *    PHASE,PDEV,DS(4,DP),SD1,SD2,MAXMD,AMODE,NEWBRK)

C NEWBRK comes from DECIDE3; ACCBRK goes to the main program
      IF (NEWBRK.EQ.'Y') THEN
          ACCBRK=.TRUE.
      ELSE
          ACCBRK=.FALSE
          END IF

      RETURN
      END
     SUBROUTINE MULDAT(TIME,PHASE,AMP,IB,IE,DS,SP,SBS,SBP,
     *    DELTAT,SD1,SD2,PDEV)

     REAL TIME(*),PHASE(*),AMP(*),DS(9,*),SD1(*),SD2(*),PDEV(*)
     real  ok,fitlin
     INTEGER SP,SBS(*),SBP
C*****************************************************************
C    subroutine to calculate the various deviations.
C    TIME is the time array
C    PHASE is the phase array
C    DS DATA STACK
C    In the Data Stack:
C         DS(1,i) is the slope
```

```
C          DS(2,i) is the y-intercept
C          DS(3,i) is the acceptance variable
C          DS(4,i) is the standard deviation
C          DS(5,i) is the flatness
C          DS(6,i) is the amplitude modulation
C          DS(7,i) is the maximum deviation
C          DS(8,i) is the center deviation
C          DS(9,i) is the energy
C     DSO Stack Pointer
C     SP Stack Pointer
C     AMP is the amplitude array
C     SBS is the Suggested Break Stack
C     SBP is the Suggested Breaker Pointer
C     DELTAT is the time difference between samples
C     SD1 is the standard deviation Stack for the left subintervals
C     SD2 is the standard deviation Stack for the right subintervals
C*****************************************************************

100   CONTINUE
c fill the data stack in row SP
      CALL LINDAT(TONE,PHASE,IB,IE,DS,SP,SBS(1),DELTAT)

C fill the suggested break stack with indices of multiple breaks
      CALL FMBRKS(TIME,PHASE,IB,IE,DS,(1,SP),DS(2,SP),SBS,SBP)
C calculate standard deviations of subintervals
      SD1(1)=0
      IF(SBS(1)-IB.GT.1)                          THEN
             ok = FILTLIN(IB,SBS(!).TIME.PHASE.SLOPE.YINT)
             if (ok.lt.1) then
                 write (6,*) 'fitlin error from muldat'
                 call newlin
             end if
          CALL LINDEV(IB,SBS(!),TIME,PHASE,SLOPE,YINT.
                  sd1(10,DELTAT,dummy)
      END IF
      DO 99 IT=1,SBP-1
          IF(SBS(IT+1)-SBS(IT).GT.1)              THEN
          ajunk = FITLIN(SBS(IT),SBS(IT+1),TIME,PHASE,SLOPE,YINT)
          CALL LINDEV(SBS(IT),SBS(IT+1),TIME,PHASE,SLOPE,
                  YINT,sd1(it+1),DELTAT,dummy)
          SD2(IT)=SD1(IT+1)
          END IF
          PDEV(IT)=ABS(PHASE(SBS(IT))-(DS(2,SP)+DS(1,SP)*
                       TIME*SBS(IT))))
99    CONTINUE
      PDEV(SBP)=ABS(PHASE(SBS(SBP))-(DS(2,SP)+DS(1,SP)*
     *                 TIME(SBS(SBP))))
      IF(IE-SBS(SBP).GT.1) THEN
              ajumk=FITLIN(SBS(SBP),IE,TIME,PHASE,SLOPE,YINT)
              CALL LINDEV(SBS(SBP),IE,TIME,PHASE,SLOPE,YINT,
                       sd2(sbp),DELTAT,dummy)
      END IF
      RETURN
      END
      SUBROUTINE FMBRKS(T,P,JSTART,JEND,SLOPE,YINT,BRK,NB)
C    ***************************************************************
C    *    subroutine to Find Multiple BReaKS                       *
C    ***************************************************************

      REAL    T(*), P(*), RES(4096)
      INTEGER ZERO(0:99), BRK(*)

C Calculate the residual phase
      DO 91 J = JSTART, JEND
          RES(J) = P(J) - )YINT+SLOPE*T(J))
91    CONTINUE
```

```
C Find the zero crossings in the residual phase.  Zero markings are
C always at the index immediately AFTER the actual zero crossing.
      NC=0
C     NC is the number of zero crossings
      DO 200 J = JSTART+1, JEND
          IF (SIGN(1.,RES(J)) .EQ. SIGN(1.,RES(J-1))) GOTO 200
          NC       = NC+1
          ZERO(NC) = J
200   CONTINUE
      ZERO(0)     = JSTART
      ZERO(NC+1) = JEND

C Break at the maximum deviation point between zero crossings if
C you find more than 2 extrema.
      NB = 0
C     NB is the number of breaks suggested
      DO 300 J = 1, NC+1
C             TYPE*,NEXTREMA(RES,ZERO(J-1),ZERO(J)),ZERO(J-1),ZERO(J)
C             TYPE*,NEXTREMA(RES,ZERO(J-1),ZERO(J)),ZERO(J-1),ZERO(J)
          IF ( NEXTREMA(RES,ZERO(J-1),ZERO(J)) .LT. 3 ) GOTO 300
          NB = NB+1
          BRK(NB) = NMAX (RES,ZERO(J-1),ZERO(J)-1)
         IF (BRK(NB).EQ.JSTART.OR.BRK(NB).EQ.JEND) THEN
             NB=NB-1
             END IF
300   CONTINUE
      RETURN
      END
      SUBROUTINE ENDBRK(TIME,PHASE,AMP,LTBRK,RTBRK,DS,DP,SBS,SBP,
     *    AMODE,NEWBRK,APPLOT,MAXED,ED,EDLEFT,EDRIGHT,SFIT,
     *    PHOFIT,NELEFT,NERIGHT,MD,MP,segst)
C
C main control routine for end breaks
C
      REAL              PHASE(*),TIME(*),AMP(*),DS(9,*),MAXED,MD
      INTEGER           RTBRK,DP,SBS(*),SBP,segst
      LOGICAL           AMODE,NEWBRK,APPLOT
      CHARACTER*1       MOVEIN

      SD=DS(4,DP)
      NEWBRK=.FALSE
      ISSEG=LTBRK
      ISSEG=RTBRK

10    CONTINUE

C plot the end breaks and slope
      IF (APPLOT.AND..NOT.AMODE) THEN
          CALL PLTEB(TIME.LTBRK,RTBRK,SFIT,PHOFIT,segst)
          END IF

C decide which method of movement to use, if any
      CALL DECIDE2(PHASE,TIME,AMODE,LTBRK,RTBRK,SFIT,PHOFIT,MOVEIN,
     *    ISSEG,IESEG,MD,MP,ED,NELEFT,NERIGHT,EDLEFT,EDRIGHT,MAXED,SD)

C return if no move in desired
      IF(MOVEIN.EQ.'N'.OR.MOVEIN.EQ.'n') THEN
          DS(1,DP)=SFIT
          DS(2,DP)=PHOFIT
          DS(4,DP)=SD
          DS(7,DP)=MD
          SBP=2
          SBS(1)=LTBRK
          SBS(2)=RTBRK
          RETURN
          END IF
```

```
C execute the move as specified by the MOVEIN variable
      CALL MOVE(MOVEIN,TIME,PHASE,LTBRK,RTBRK,NELEFT,NERIGHT,ED
     *    EDLEFT,EDRIGHT,MP,MAXED,NEWBRK)
C get new fit for the new end breaks
      CALL NEWFIT(OHASE,TIME,LTBRK,RTBRK,SFIT,PHOFIT)

C get new deviation values for the new fit
      CALL ENDDAT(PHASE,TIME,LTBRK,RTBRK,SFIT,PHOFIT,ED,EDLEFT,
     *       EDRIGHT,NELEFT,NERIGHT,MD,MP,SD)

C go back and process new segment
      GOTO 10
      END
      SUBROUTINE CENBRK(TIME,PHASE,AMP,ISSEG,IESEG,DS,DP,SBS,SBP,
     *    APPLOT,AMODE,ACCBRK,MAXMD,MP,segst)
C
C main control routine for center breaks
C
      REAL              TIME(*),AMP(*),PHASE(*),DS(9,*),MAXD
      REAL              PDEV(1024),SD2(100),SD1(100)
      INTEGER           SBS(*),DP,SBP,segst
      LOGICAL           APPLOT,AMODE,ACCBRK
      Character*1       NEWBRK
C CENDAT calculates the standard deviation for each subinterval
      SBS(1)=MP
      SBP=1
      CALL CENDAT(TIME,PHASE,ISSEG,IESEG,SBS,SD1,SD2)

C PLIFT plots the data to the plotting terminals
      IF(APPLOT.AND..NOT.AMODE)
     *       CALL PLIFT(TIME,ISSEG,IESEG,DS,DP,SBS,SBP,segst)

C DECIDE1 returns the accepted center break in the SBS stack
      PDEV(1)=DS(7,DP)
      CALL DECIDE 1(ISSEG,DS(1,DP),DS(2,DP)SBS,SBP,TIME
     *       PHASE,PDEV,DS(4,DP),SD1,SD2,MAXMD,AMODE,NEWBRK)

C NEWBRK comes from DECIDE3:  ACCBRK goes to the main program
      IF(NEWBRK.EQ.'Y') THEN
          ACCBRK=.TRUE
       ELSE
          ACCBRK=.FALSE
          END IF
      RETURN
      END
      SUBROUTINE UPDATE(ACC,SS,SP,IBS,IBP,SBS,SBP,TIME,APPLOT,DS)
C
C routine to update stack pointers after
C acceptance or rejection of a break
C
C    SS is the segment stack
C    SP is the pointer for SS
C    IBS is the initial break stack
C    IBP is the pointer for IBS
C    SBS is the suggested break stack
C    SBP is the pointer for SBS
C    ACC is the logical variable for acceptance of the BREAK
C
      REAL      TIME(*),DS(9,*)
      LOGICAL ACC,APPLOT
      INTEGER SS(2,*),SP,IBS(*),SBS(*),SBP,OSP
      SAVE OSP

      IF(SP.EQ.O) OSP=0
      IF (ACC) THEN
          DO 95 LL=1,SBP
```

```
            IBS(IBP+LL)=SBS(SBP+1-LL)
95        CONTINUE
          IBP=IBP+SBP
          SBP=0
      ELSE
          SP=SP+1
          IF(SP.GT.1) SS(1,SP)=SS(2,SP-1)
          SS(2,SP)=IBS(IBP)
          IBP=IBP-1
          SPB=0
          IF(APPLOT)THEN
             CALL PLTPB (TIME,DS,SS,SP,OSP)
             END IF
      END IF
      RETURN
      END
      SUBROUTINE DECIDE1(ISSEG,IESEG,SLOPE,PHO,SBS2,SBP2,TIME,PHASE,
     *    PDEV,SD,SD1,SD2,MAXCD,AMODE,NEWBRK)
C
C main decision routine for center breaks
C
      REAL              TIME(*),PHASE(*),SD1(*),SD2(*),PDEV(*),MAXCD
      INTEGER           SBS1(1024),SBS2(*),SBP2
      LOGICAL           AMODE
      CHARACTER*1       ACCBRK,NEWBRK

      CALL XMITI (SBP2,SBS2,SBS1)
      SBP1=SBP2
      SBP2=0
      NEWBRK='N'

      IF(AMODE) THEN
          DO 95 J=1, SBP1
             SEGLEN=TIME(IESEG)-TIME(ISSEG)
             CALL AUTODE3(PDEV(J),SD,SD1(J),SD2(J),MAXCD,ACCBRK,
     *               SEGLEN)
             IF(ACCBRK.EQ.'Y') THEN
                NEWBRK='Y'
                SBP2=SBP2+1
                END IF
95        CONTINUE
      ELSE
          DO 96 J=1, SBP1
             CALL PRINT4(TIME,PDEV(J),SD,SBS1(J),SD1(J),SD2(J)
     *                   ISSEG,IESEG,ACCBRK)
             IF(ACCBRK.EQ.'Y') THEN
                NEWBRK='Y'
                SBP2=SBP2+1
                SBS2(SBP2)=SBS1(J)
                END IF
96        CONTINUE
          END IF
      RETURN
      END

      SUBROUTINE DECIDE2(PHASE,TIME,AMODE,LTBRK,RTBRK,SFIT,PHOFIT,
     *    MOVEIN,ISSEGs,IESEGs,MD,MP,ED,NELEFT,NERIGHT,EDLEFT,
     *          EDTIGHT,MAXED,SD)
C
C decision routine for end breaks
C
      REAL              PHASE(*),TIME(*),MAXED,MD
      INTEGER           RTBRK
      LOGICAL           AMODE
      CHARACTER*1       MOVEIN
```

```
      IF(AMODE) THEN
          CALL AUTODEC2(MAXED,ED,MD,MP,NELEFT,NERIGHT,MOVEIN,EDLEFT,
                        EDRIGHT,LTBRK,RTBRK)
        ELSE
          CALL PRINT1(TIME(LTBRK),TIME(RTBRK),SD,TIME(ISSEGs),
     *       TIME(IESEGs),EDLEFT,EDRIGHT,MD,TIME(MP),SFIT,MOVEIN)
          END IF
      RETURN
      END

      SUBROUTINE DECIDE3(ISSEG,IESEG,SLOPE,PHO,SBS2,SBP2,TIME,PHASE,
     *    PDEV,SD,SD1,SD2,MAXMD,AMODE,NEWBRK)
C
C main decision routine for multiple breaks
C
      REAL                TIME(*),PHASE(*),SD1(*),SD2(*),PDEV(*),MAXMD
      INTEGER             SBS1(1024),SBS2(*),SBP2
      LOGICAL             AMODE
      CHARACTER*1         ACCBRK,NEWBRK

      CALL XMITI(SBP2,SBS2,SBS1)
      SBP1=SBP2
      SBP2=0
      NEWBRK='N'

      IF(AMODE) THEN
          DO 97 J=1,SBP1
             SEGLEN=TIME(IESEG)-TIME(ISSEG)
             CALL AUTODE3(PDEV(J),SD,SD1(J),SD2(J),MAXD,ACCBRK,
                          SEGLEN)
             IF(ACCBRK.EQ.'Y') THEN
                NEWBRK='Y'
                SBP2=SBP2+1
                END IF
97        Continue
      ELSE
          DO 98 J=1,SBP1
             CALL PRINT4(TIME,PDEV(J),SD,SBS1(J),SD1(J),SD2(J),
     *          ISSEG,IESEG,ACCBRK)
             IF(ACBRK.EQ.'Y') THEN
                NEWBRK ='Y'
                SBP2=SBP2+1
                SBS2(SBP2)=SBS1(J)
                END IF
98        Continue
          END IF
      RETURN
      END
      SUBROUTINE AUTODEC2(MAXED,ED,MD,MP,NELEFT,NERIGHT,MOVEIN,
     *    EDLEFT,EDRIGHT,LTBRK,RTBRK)
C
C routine for auto decision on end breaks
C    MAXED  -parameter for deviation
C    ED     -maximum end deviation
C    MD     -maximum deviation
C    MP     -index of MD
C    NELEFT -index of nearest left extrema
C    NERIGHT-index of nearest right extrema
C
        REAL              MAXED,MD
        INTEGER           RTBRK
        CHARACTER*1       MOVEIN

        IF(ED.GT.MAXED) THEN
             MOVEIN='4'
```

```
        RETURN
        END IF
      IF(ED.LE.MAXED.AND.(MP.EQ.NELEFT.OR.MP.EQ.NERIGHT).AND
     *       MD.GT.MAXED) THEN
          MOVEIN='5'
          RETURN
          END IF
      MOVEIN='N'
      RETURN
      END

SUBROUTINE AUTODE3(PDEV,SD,SD1,SD2,MAXMD,ACCBRK,SEGLEN)

C*****************************************************************
C Subroutine to return decision on whether to accept a multiple break
C where:
C PDEV      phase deviation value at the suggested break
C SD      standard deviation over the entire interval
C    SD1    the standard deviation of the left subinterval
C    SD2    the standard deviation of the right subinterval
C    MAXMD     parameter with the center break threshold
C    ACCBRK is a character *1 set 'Y' for acceptance of the suggested br
C*****************************************************************

      REAL                MAXMD,PDEV
      CHARACTER*1         ACCBRK

      ACCBRK='N'
C compare phase deviation with MAXMD
      IF(PDEV.GT.MAXMD) THEN
      ACCBRK='Y'
      RETURN
      END IF
C if the original segment is longer than .15s, return here
      IF(SEGLEN.GE..15) RETURN

C  compare sub-interval std dev to std dev for entire segment
C     IF(SD1.LT.0.9*SD.AND.SD2.LT.9*SD) THEN
C         ACCBRK='Y'
C         RETURN
C         END IF

      RETURN
      END
      SUBROUTINE MOVE(MOVEIN,TIME,PHASE,LTBRK,RTBRK,NELEFT,NERIGHT,ED
     *    EDLEFT,EDRIGHT,MP,MAXED,NEWBRK)
C
C routine to call the proper MOVEINv subroutine depending
C on the value of MOVEIN
C
      INTEGER             RTBRK
      Characater          MOVEIN
      LOGICAL             NEWBRK

      NEWBRK=.TRUE
C error checking
      IF(MOVEIN.NE.'L'.AND.MOVEIN.NE.'l'.AND.MOVEIN.NE.'R'.AND.
     *       MOVEIN.NE.'r'.AND.MOVEIN.NE.'Y'.AND.MOVEIN.NE.'y'.AND.
     *       MOVEIN.NE.'4'.AND.MOVEIN.NE.'5')THEN
          WRITE (6,66)
          call newlin
66        FORMAT (/'Illegal MOVEIN value/')
          RETURN
          END IF
```

```
C move in left break by 1 sample
      IF(MOVEIN.EQ.'L'.OR.MOVEIN.EQ.'1') CALL MOVEIN1 (LTBRK)

C move in right break by one sample
      IF(MOVEIN.EQ.'R'.OR.MOVEIN.EQ.'r') CALL MOVEIN2(RTBRK)

C this is a computer determined move in, called when in manual mode
C see MOVEIN3 for details
          CALL MOVEIN3(TIME,PHASE,MP,LTBRK,RTBRK,NELEFT,NERIGHT,MAXED)

C automated combination of MOVEIN1 and MOVEIN2
      IF (MOVEIN.EQ.'4') CALL MOVEIN4(ED,EDLEFT,EDRIGHT,LTBRK,RTBRK)
C automated move in to an end deviation extrema
      IF (MOVEIN.EQ.'5') CALL MOVEIN5(MP,LTBRK,RTBRK)

      RETURN
      END
      SUBROUTINE MOVEIN1(LTBRK)
C move in left break by one sample
      LTBRK=LTBRK+1
      RETURN
      END

      SUBROUTINE MOVEIN2(RTBRK)
C move in right break by one sample
      INTEGER RTBRK
      RTBRK=RTBRK-1
      RETURN
      END

      SUBROUTINE MOVEIN3(TIME,PHASE,MP,LTBRK,RTBRK,NELEFT,NERIGHT,
     *        MAXED)
C auto move in called when in manual mode
      REAL    TIME(*),PHASE(*),MD,MAXED,SD
      INTEGER RTBRK

C move left break in to nearest phase deviation extrema
      IF(MP.EQ.NELEFT) THEN
          LTBRK=NELEFT
          RETURN
          END IF
C move right break in to nearest phase deviation extrema
      IF(MP.EQ.NERIGHT) THEN
          RTBRK=NERIGHT
          RETURN
          END IF

C move in left break until either left deviation is < right
C deviation or until left deviation is < MAXED
      IF(MP.EQ.LTBRK) THEN
10        CONTINUE
          LTBRK=LTBRK+1
          CALL NEWFIT(PHASE,TIME,LTBRK,RTBRK,SLP,YO)
          CALL ENDDAT(PHASE,TIME,LTBRK,RTBRK,SLP,YO,ED,EDLEFT,EDRIGHT,
     *                NELEFT,NERIGHT,MD,MP,SD)

          IF(EDLEFT.LT.MAXED.OR.EDLEFT.LT.EDRIGHT) RETURN
          GOTO 10
          END IF
C move in right break until either right deviation is < left
C deviation or until right deviation is < MAXED
      IF(MP.EQ.RTBRK) THEN
20        CONTINUE
          RTBRK-1
          CALL NEWFIT (PHASE,TIME,LTBRK,RTBRK,SLP,YO)
```

```
          CALL ENDDAT(PHASE,TIME,LTBRK,RTBRK,SLP,YO,ED,EDLEFT,EDRIGHT,
     *                NELEFT,NERIGHT,MD,MP,SD)
          IF (EDRIGHT.LT.MAXED.OR.EDRIGHT.LT.EDLEFT) RETURN
          GOTO 20
          END IF
C if MP .ne.ltbrk.rtbrk, neleft, neright, move in 1 point on the
C side of maximum deviation
      CALL NEWFIT(PHASE,TIME,LTBRK,RTBRK,SLP,YO)
      CALL ENDDAT (PHASE,TIME,LTBRK,RTBRK,SLP,YO,ED,EDLEFT,EDRIGHT,
     *                NELEFT,NERIGHT,MD,MP,SD)
      CALL MOVEIN4(ED,EDLEFT,EDRIGHT,LTBRK,RTBRK)
      RETURN
      END

      SUBROUTINE MOVEIN4(ED,EDLEFT,EDRIGHT,LTBRK,RTBRK)
C move in the side with max deviation one sample
      INTEGER RTBRK
      IF(ED.EQ.EDLEFT) THEN
          LTBRK=LTBRK+1
      ELSE
          RTBRK=RTBRK-1
          END IF
      RETURN
      END

      SUBROUTINE MOVEIN 5 (MP,LTBRK,RTBRK)
C move in break to proper max deviation
      INTEGER RTBRK
      IF(MP-LTBRK.LT.RTBRK=MP) THEN
          LTBRK=MP
      ELSE
          RTBRK=MP
          END IF
      RETURN
      END
      SUBROUTINE VALSEG(amp,PHASE,SS,DS,SP,SLPMIN,SLPMAX,SDMIN,SDMAX
     *    SDSEG,tsO,tsOp,MAXS,MAXP,SEGMIN,LONGSEG,PJSEGLN,NMBREXT,a1,a2)
c*****************************************************************
c    *subroutine to screen out segments that result in unreliable  *
c    *measurements.  Unreliable segments have their DS(3,i) value  *
c    *MARKed zero, and reliable ones have their DS(3,i) value      *
c    *marked unity                                                 *
c    *TIME time array                                              *
c    *SS Segment Stack                                             *
c    *SP Segment stack Pointer                                     *
c    *DS Data Stack holding data for each segment                  *
c    *In the Data Stack                                            *
c    *    DS(1,i) is the slope of the linear fit                   *
c    *    DS(2,i) is the y-intercept at 0 of linear fit            *
c    *    DS(3,i) is the acceptance parameter (1. for accept)      *
c    *                                        (0. for reject)      *
c    *    DS(4,i) is the standard deviation                        *
c    *    DS(5,i) is the flatness value                            *
c    *    DS(6,i) is the maximum amplitude                         *
c    *    DS(7,i) is the maximum phase deviation from the fit      *
c    *    DS(8,i) is the center phase deviation value              *
c    *    DS(9,i) is the number of amplitude maxima                *
c    ****************************************************************
c
c a1 and a2 are character*1's whose value indiates which validation
c algorithm to use if one wishes to use both the logic must be
c modified to set up the hierarchy.
      REAL*4TIME(4096),PHASE(*),DS(9,*),LONGSEG,amp,(*)
      real slpmin,segmin,sdmin,sdmax,pjsegln,sdseg
      INTEGER SS(2,*),AP,tsO(*),tsOp,MAXS(*),acctmp(1024)
      integer ibseg,ieseg,it,nmbrext,maxp
```

```
      LOGICAL TUSHORT,TUFEWE,TUSMOOTH,TUMUOHF,ONEMAX
      LOGICAL LONG,HASP,JBRK,OUTSIDE
      character*1       a1, a12
cc PSOF access flag - see TGM for details
      logical psofis
      common/psof/psofis
      COMMON /TSTMON/IBSEG,TIME
c this is the offset between the do points in the transform domain
c when the entire data is used (absolute) and when a smaller segment
c (physical) is used
      common/abphys/dooff,fact
      if(fact.eq.0) fact = 1

c first algorithm (Peter Chuan)
      if (a1.eq.'Y') then
20        CONTINUE
          DO 185 IT=1,SP
             DS 185 IT=1,SP
             DS(3,IT)=1
             IBSEG=SS(1,TT)
             IESEG=SS(2,IT)

C    Test 1. Reject segments with phase slopes OUTSIDE
C         the interval (SLPMIN,SLPMAX)
          IF(OUTSIDE(DS(1,IT),SLPMIN,SLPMAX) ) THEN
               DS(3,IT)=0
               GOTO 100
          END IF
C    Test 2, Reject shorter than .0093 sec.
          IF( TUSHORT(SEGMIN) THEN
               DS(3,IT)=0
               GOTO 100
          END IF

C    Test 3, Accept segments longer then lonseg seconds
          IF (LONG(LONGSEG) )THEN
               DS(3,IT)=1
               GOTO 100
          END IF

C    Test 4, Reject short segment (<0.04s) with a phase jump break
C         at either end
C         IF(TUSHORT(PJSEGLN) .and. HASPJBRK(TSO,TSOP) ) THEN
C              DS(3,IT)=0
C              GOTO 100
C     END IF

C    Test 5, Accept segment with flatness value greater than 0.6
C         IF( LARGEFV(DS(5,IT).,6) )THEN
C              DS(3,IT)=0
C              GOTO 100
C         END IF

C    Test 6, Reject segments with s.d. greater than SDMAX
          IF(TUMUCHF (DS(4,IT),SDMAX) ) THEN
               DS(3,IT)=0
               GOTO 100
          END IF

C    Test 7, Reject segments with 3 or fewer extrema in residual
C         phase if the segment is shorter than SEGMIN
          IF (TUSHORT(PJSEGLN)) THEN
               IF ( TUFEWE(PHASE,DS(1,IT),NMBREXT) )THEN
                  DS(3,IT)=0
                  GOTO 100
```

```
                END IF
            END IF
C     Test 8. Reject segments with s.d. less than SDMIN and with one
C             or no maximum in the amplitue function
              IF (TUSMOOTH(DS(4,IT),SDMIN) .and
     *           ONEMAX(MAXS,MAXP) THEN
                 DS(3,IT)=0
                  GOTO 100
              END IF
100           CONTINUE
              acctmp(it) = ds(3,it)
              ds(1,it) = ds(1,it), fact + dcoff
185         Continue
      end if

c Steve Hershkowitz' validation criteria standard deviation between
c sdmin and sdmax and segment longer than segmin
      if(a2.eq.'Y') then
          do 186 it = 1, sp
              ibseg=ss(1,it)      !communicate with common block
              ieseg=ss(2,it)
              if(ds(4,it).gt.sdmin.and.not.tushort(segmin)) then
                 ds(3,it) = 1
              else
                 ds(3,it) = 0
              end if
186       Continue
      end if

      if(psofis) then
          call psofwt(2,sp,0.0,0.0,' ',ss,ds,TIME)  !PSOF data storage
      endif
      RETURN
      END
C CENBRK performs all center break functions
C SBP, the suggested break pointer will always be 1 for center breaks
          IF (CTYPE.EQ.'C') CALL CENBRK (Tim,PH,AMP,ISSEG,IESEG,DS,
     *       DP+1,SBS,SBP,APPLOT,AMODE,NEWBRK,MAXCD,MP,segstb)
65        CONTINUE

C updates stacks and pointers according to NEWBRK and plots
C permanent breaks and slopes when necessary
          CALL UPDATE(NEWBRK,SS,SP,IBS,IBP,SBS,SBP,Tim,APPLOT,DS)

          if (ibp.gt.0) goto 10
     end if

     if(alg2.eq.'Y') then
C ordrst sorts the initial breaks so that they are in ascending order
          call ordrst (ibs,ibp)
c setseg cpnverts initial breaks into segment stack breaks, calculates
c segment attributes and plots the segments and their slopes
          call setseg (amp,ph,tim,ss,sp,ibs,ds,dp,deltat,
     *       maxs,maxp)
      end if

      return
      end
      SUBROUTINE BRKTYP(amp,PHASE,TIME,ISSEG,IESEG,SFIT,PHOFIT,ED,
     *    EDLEFT,EDRIGHT,NELEFT,NERIGHT,MD,MP,BTYPE,DS,DP,maxs,maxp)
C
C routine to decide whether to use center or end breaks
C
      REAL              PHASE(*),TIME(*),MD,DS(9,*),amp(*)
      INTEGER           MP,DP,maxs(*)          !right end extrema index
      CHARACTER*1       BTYPE
```

```
C get linear fit data
      CALL NEWFIT (PHASE,TIME,ISSEG,IESEG,SFIT,PHOFIT)
      DS(1,DP)=SFIT
      DS(2,DP)=PHOFIT

c get amp max & number of amp maxima
      ds (6,dp) = arymax(amp(isseg),ieseg-isseg+1)
      nam = 0
      do 10 j = 1, maxp
          if (maxs(j).gt.isseg.and.maxs(j).lt.ieseg) nam = nam + 1
10    Continue
      ds(9,dp) = nam

C get phase deviation values
      CALL ENDDAT(PHASE,TIME,ISSEG,IESEG,SFIT,PHOFIT,ED,EDLEFT,
     *    EDRIGHT,NELEFT,NERIGHT,MD,MP,SD)
      DS(4,DP)=SD
      DS(7,DP)=MD

C see if the maximum deviation is within 2 points of the end
      IF(MP-ISSEG.LE.2.OR.IESEG-MP.LE.2) THEN
          BTYPE = E
          RETURN
          END IF

C see if the maxima deviation is on an end extrema
      IF(NELEFT.EQ.MP) THEN
          BTYPE='E'
          RETURN
          END IF
      IF(NERIGHT.EQ.MP) THEN
          BTYPE='E'
          RETURN
          END IF

C if none of the end break conditions have been met, we have a center bre
      BTYPE='C'
      RETURN
      END
          LOGICAL FUNCTION SEGTEST (PHASE,NEWBRK,MAXS,MAXP,ISSEG,IESEG,SI
     *      SFIT,SDMIN,AMODE,SEGMIN,NMBREXT,PJSEGLIN,MD,MAXMD,LONGSEG)
C
C this routine returns a T if the segment should NOT be
C processed further
      LOGICAL NEWBRK,TUSHORT,TUFEWE,ONEMAX,TUSMOOTH,AMODE
      REAL    PHASE(*),MD,MAXMD,LONGSEG
      INTEGER MAXS(*)
      COMMON/TSTCMN/IB,IE

      IB=ISSEG
      IE=IESEG
      NEWBRK=.FALSE
      SEGTEST=.TRUE

C see is segment is too short
      IF(TUSHORT(SEGMIN) THEN
          IF(.NOT.AMODE) THEN
              CALL CCOUT (3,Char(31),1)
              CALL PRINT2
              END IF
          RETURN
          END IF
c  test the number of extrema for shorter segments
      IF(TUSHORT(PJSEGLN)) THEN
          IF(TUFEWE(PHASE,SFIT,NMBREXT)) THEN
             IF(.NOT.AMODE) THEN
```

```
                CALL CCOUT (3,Char(31),1)
                CALL PRINT6
                END IF
            RETURN
            END IF
        END IF
c test amplitude maxima and std deviation for shorter segments
      IF(TUSHORT(PJSEGLN.AND.ONEMAX(MAXS,MAXP).AND.
     *       TUSMOOTH(SD,SDMIN)) THEN
        IF(.NOT.AMODE) THEN
            CALL CCOUT (3,Char(31),1)
            CALL PRINT3
            END IF
        RETURN
        END IF
      SEGTEST=.FALSE
      RETURN
      END
```

What is claimed is:

1. A signal processing method for data collected by airborne radar apparatus, the signal processing method being used to form two-dimensional images of ground targets, in which resolution in one dimension is provided by resolution of range cells, and resolution in the other dimension is provided by resolution of Doppler cells;

said ground targets being of types which have scattering units which are large compared with the radar wavelength and therefor have a highly lobed backscattering pattern, so that over a given observation time comprising a range cell the scattering units produce responses which become stronger and weaker, alternately effectively appearing and disappearing, the response for each scattering unit having a phase function, each scattering unit being identified by the slope of the phase function during intervals in which there is a dominant response from only one scattering unit;

wherein the signal processing method includes the step of processing the responses over time intervals which are short compared to said given observation time, so that measurements of the positions of the scattering units are made with an accuracy to a small fraction of the cross-range width of the range cell being processed, the scattering units being identified by the slopes of the responses.

2. The signal processing method according to claim 1, wherein during intervals in which there are responses from two scattering units, the phase function has a slope for one scattering unit, plus an approximately sinusoidal modulation at some frequency impressed by the response for the other scattering unit, and wherein the signal processing step over a short time interval in which the sinusoidal modulation appears includes the step of identifying the two responses, so that the positions of these scattering units are also made with an accuracy which is a small fraction of the width of said range cell.

3. The signal processing method according to claim 2, wherein the step of processing the responses over short time intervals comprises identifying phase segments where, aside from high-frequency variations, the trend is linear, and measuring the slope, which is the Doppler, and translating the slip to a measurement of the cross range position, so that for each slope a point is marked at which a corresponding scattering unit appears, with a similar analysis for intervals in which there are responses from two scattering units.

4. The signal processing method according to claim 1, wherein the step of processing the responses over short intervals comprises finding and measuring phase slopes corresponding to scatterer locations as follows:

beginning with the unwrapped phase function of the return signal for a specific range gate, which is the phase function minimize the phase change from one pulse to the next, the duration of the signal being normalized to one second, then locating jumps in the phase and using them to define breakpoints (the limits of time intervals which correspond to dominance of particular scatterers);

searching the phase function for points of extremal curvature (there will be an extremum on each side of a phase jump) with curvatures of magnitude greater than a value SCHNG (if the phase difference at the extremal points is greater than a value PJUMP and the corresponding amplitude function has a minimum between the times of the extremal phase curvatures then a phase jump is said to have occurred), an amplitude minimum being accepted only if the the amplitude at the minimum is less than a value AMPMIN times the amplitude of the first amplitude peak after the minimum under consideration (when a phase jump occurs the extremal points surrounding it are taken as breakpoints);

each segment resulting from the above step being considered for further segmentation, making a linear least-squares fit to the phase of each segment, no further segmentation being done to segments of duration less than a value SEGMIN, segments of duration less than a value PJSEGLN with fewer than a value NMBREXT residual extrema in the difference between the fit line and the phase, and segments of duration less than a value PJSEGLN with fewer than two amplitude extrema and a standard deviation about the fit less than a value SDMIN;

searching remaining segments for deviation from linearity, additional breakpoints being added at points of maximal deviation, the first additional breakpoints being assigned through a multiple (per segment) breakpoint assignment algorithm, as follows, the intersection points of the fit line and the phase being found, breakpoints being assigned between these intersection points at the times of maximal deviation between the line and the phase, if this deviation is greater than 0.25 cycles;

making linear least-squares fits to the phases of the resultant segments, if the maximum deviation between the fit line and the phase occurs at the end of a segment, and is greater than a value ED, the end point being dropped from consideration for phase slope measurement and a breakpoint being assigned at the new segment endpoint, if the maximum deviation occurs away from the segment endpoints, and is greater than a value CD, an additional breakpoint is assigned at the point of maximum deviation, whenever a new segment is defined a linear least-squares fit being made and deviations examined, breakpoints being assigned and the process iterated unit all deviations are less than the values ED and CD;

examining the resultant segments for compliance with criteria which indicate a single dominant scatterer, measured with sufficient accuracy over a long enough duration so that the phase slope corresponds to the scatterer cross-range location, the first criterion being that an acceptable segment have a phase slope between values MNSLOPE and MXSLOPE wherein an acceptable segment must also have minimum length MSL, any segment with length greater than a value SLL being accepted without further testing;

rejecting candidate segments shorter than a value PJSEGLN with either a phase jump break at an endpoint or with a value NRE or fewer residual extrema in the difference between the phase and the fit line, segments with a standard deviation of the phase about the fit line greater than a value MAXSD being rejected, as are segments with a standard deviation less than a value MINSD and fewer than two amplitude maxima;

segments which have not been eliminated by the above tests being accepted, their phase slopes indicating scatterer cross-range locations.

* * * * *